US009851445B2

(12) United States Patent
Meerkerk et al.

(10) Patent No.: US 9,851,445 B2
(45) Date of Patent: Dec. 26, 2017

(54) REAL-TIME LOCATING SYSTEM USING GPS TIME DIFFERENCE OF ARRIVAL WITH DIGITAL OFF-AIR ACCESS UNITS AND REMOTE UNITS

(71) Applicant: DALI SYSTEMS CO. LTD., George Town, Grand Cayman (KY)

(72) Inventors: Daryl Meerkerk, Burnaby (CA); Shawn Patrick Stapleton, Burnaby (CA)

(73) Assignee: Dali Systems Co. Ltd., George Town (KY)

( * ) Notice: Subject to any disclaimer, the term of this patent is extended or adjusted under 35 U.S.C. 154(b) by 519 days.

(21) Appl. No.: 14/257,209

(22) Filed: Apr. 21, 2014

(65) Prior Publication Data
US 2014/0340255 A1 Nov. 20, 2014

Related U.S. Application Data

(60) Provisional application No. 61/815,023, filed on Apr. 23, 2013.

(51) Int. Cl.
*G01S 19/11* (2010.01)
*G01S 5/10* (2006.01)
*G01S 19/00* (2010.01)

(52) U.S. Cl.
CPC ............... *G01S 19/11* (2013.01); *G01S 5/10* (2013.01)

(58) Field of Classification Search
CPC ... G01S 5/02; G01S 5/10; G01S 19/01; G01S 19/03; G01S 19/10; G01S 19/11;
(Continued)

(56) References Cited

U.S. PATENT DOCUMENTS 5,852,412 A * 12/1998 Stangeland ............. G01S 19/07
340/945
6,300,899 B1 10/2001 King
(Continued)

OTHER PUBLICATIONS

Notification of Transmittal of the International Search Report and the Written Opinion of the International Searching Authority, or the Declaration and International Search Report and Written Opinion of the International Searching Authority for International Application No. PCT/US2014/034822 dated Sep. 23, 2014, 9 pages.
(Continued)

Primary Examiner — Bernarr E Gregory
(74) Attorney, Agent, or Firm — Kilpatrick Townsend & Stockton LLP

(57) ABSTRACT

A real-time locating system (RTLS) for localization using satellite navigation signals in a Distributed Antenna System includes Off-Air Access Units (OAAUs), each being operable to receive an individual satellite navigation signal from a satellite and to route signals optically to a digital access unit (DAU). Remote digital remote units (DRUs) are located at Remote locations and are operable to receive signals the DAUs. Each individual satellite navigation signal can be appropriately delayed (in a manner that accounts for a DRU's location). For each antenna, a separation distance between a mobile station and a DRU can be estimated based on a signal receipt time at the station. In combination, these distances can be used to estimate the mobile station's precise indoor position.

19 Claims, 19 Drawing Sheets

(58) Field of Classification Search
CPC .. G01S 19/07; H04B 7/14; H04B 7/15; H04B 7/185; H04B 7/1851; H04B 7/18513; H04W 28/02; H04W 28/08; H03F 3/20; H03F 3/24
See application file for complete search history.

(56) References Cited

U.S. PATENT DOCUMENTS

| | | | |
|---|---|---|---|
| 6,859,641 B2 * | 2/2005 | Collins | H04B 7/18513 455/139 |
| 7,602,335 B2 * | 10/2009 | Pan | G01S 19/11 342/357.23 |
| 8,737,300 B2 * | 5/2014 | Stapleton | H03F 3/24 370/328 |
| 9,148,839 B2 * | 9/2015 | Hejazi | H04W 28/08 |
| 2003/0008663 A1 | 1/2003 | Stein et al. | |
| 2006/0250303 A1 | 11/2006 | Thiel et al. | |
| 2007/0096985 A1 | 5/2007 | Torimoto et al. | |
| 2008/0117101 A1 | 5/2008 | Pan | |
| 2011/0177827 A1 | 7/2011 | Crilly, Jr. et al. | |
| 2012/0286992 A1 | 11/2012 | Tekin et al. | |

OTHER PUBLICATIONS

International Preliminary Report on Patentability for International Application No. PCT/US2014/034822 dated Nov. 5, 2015, 7 pages.

* cited by examiner

REAL-TIME LOCATING SYSTEM USING GPS TIME DIFFERENCE OF ARRIVAL WITH DIGITAL OFF-AIR ACCESS UNITS AND REMOTE UNITS

CROSS-REFERENCES TO RELATED APPLICATIONS

This application claims priority to U.S. Provisional Patent Application No. 61/815,023, filed on Apr. 23, 2013, entitled "Real-Time Locating System using GPS Time Difference of Arrival with Digital Off-Air Access Units and Remote Units," the disclosure of which is hereby incorporated by reference in its entirety for all purposes.

BACKGROUND OF THE INVENTION

Real-time locating systems (RTLS) are used to automatically identify and track the location of objects or people in real time, usually within a building or other contained area. Currently, no standard for an RTLS has been adopted in a widespread manner, adversely impacting deployment.

ARTLS typically relies on anchors with known positions rather than relying on satellites, since satellite signals are not typically available at indoor positions as a result of signal attenuation resulting from roofs and other building structures.

Despite the progress made in RTLS design and implementation, there is a need in the art for improved methods and systems related to localization.

SUMMARY OF THE INVENTION

Embodiments of the invention generally relate to wireless communication systems employing Distributed Antenna Systems (DAS) as part of a distributed wireless network. More specifically, embodiments of the present invention relate to a DAS utilizing a digital Off-Air Access Unit (OAAU). In a particular embodiment, the present invention has been applied to receive GPS signals at the OAAUs that can be configured in a star configuration or a daisy chained configuration. The methods and systems described herein are applicable to a variety of communications systems including systems utilizing various communications standards.

Satellite navigation systems, including the Global Positioning System (GPS) can have diverse applicability, such as assisting with traffic management, navigation, medical emergency services as well as location-based services for handsets. GPS is discussed herein as an exemplary satellite navigation system, although other systems, including GLONASS (Russian), Galileo (Europe), QZSS (Japanese), and BeiDou (Chinese) are included within the scope of the present invention and should be understood to fall under the umbrella of systems collectively referred to as GPS herein. Although GPS positioning is prevalent in outdoor applications, indoor localization using GPS is not common, likely due to large signal attenuation caused by the building walls. Most indoor positioning solutions require unique infrastructure that is complicated and expensive to deploy. The indoor positioning architecture provided by embodiments of the present invention uses existing GPS Satellite infrastructure and can be used with standard handsets that contain GPS receivers. One of ordinary skill in the art would recognize that the present disclosure is also applicable to environments where there are no line-of-sights with the GPS satellites, including but not limited to tunnels, subways, underpasses, undergrounds, caves, outdoor areas with physical overhead covers or obstructions (e.g., an outdoor area surrounded by tall buildings).

A DAS provides an efficient means of distributing signals over a given geographic area. The DAS network comprises one or more digital access units (DAUs) that function as the interface between OAAUs and digital remote units (DRUs). The DAUs can be collocated with the OAAUs. Under certain embodiments, the OAAUs are not collocated with the DAUs. OAAUs can be used to relay GPS Satellite signals to one or more DAUs or directly to one or more DRUs. One or more OAAUs can be used to communicate with one or more Satellites. The OAAUs can thus relay RF GPS signals between the Satellite and the coverage area.

According to an embodiment of the present invention, a method for localization using satellite navigation signals in a DAS is provided. The method includes receiving a signal that originated from a satellite, introducing a delay to the signal, and transmitting the signal to an antenna.

According to an embodiment of the present invention, a system for indoor localization using satellite navigation signals in a DAS is provided. The system includes a plurality of OAAUs. Each of the plurality of OAAUs is operable to receive an individual satellite navigation signal from at least one of a plurality of satellites and operable to route signals optically to one or more DAUs. The system also includes a plurality of remote DRUs located at a Remote location. The plurality of remote DRUs is operable to receive signals from a plurality of local DAUs. The system further includes an algorithm to delay each individual satellite navigation signal for providing indoor localization at each of the plurality of DRUs. A mobile station can then receive a set of signals, e.g., during different time intervals. Using data from the signals, the mobile station can identify—for each signal—a source location and time delay. The locations and time delays can then be collectively analyzed to estimate a current location of the mobile station.

According to an embodiment of the present invention, a method for localization using satellite navigation signals in a DAS is provided. The method includes receiving a first signal that originated at a first satellite and receiving a second signal that originated at a second satellite. The method also includes transmitting a first portion of the first signal to an antenna while a switch is in a first position and transmitting a second portion the second signal to the antenna while the switch is in a second position.

According to another embodiment of the present invention, a non-transitory computer-readable storage medium comprising a plurality of computer-readable instructions tangibly embodied on the computer-readable storage medium is provided, which, when executed by one or more data processors, cause the one or more data processors to: determine a position of a switch, cause a first portion of a first signal to be transmitted to an antenna while a switch is in a first position, the first signal having originated at a first satellite, and cause a second portion the second signal to be transmitted to the antenna while the switch is in a second position, the second signal having originated at a second satellite.

According to yet another embodiment of the present invention, a mobile station for localization using satellite navigation signals in a DAS is provided. The mobile station includes a receiver operable to receive a wireless signal from an antenna, the signal including a first portion received at the mobile station during a first time period and a second portion received at the mobile station during a second time period, the first portion identifying a first satellite, and the second portion identifying a second satellite. The mobile station also includes a non-transitory computer-readable storage medium comprising a plurality of computer-readable instructions tangibly embodied on the computer-readable storage medium, which, when executed by one or more data processors, cause the one or more data processors to: simultaneously or concurrently analyze the first portion of the signal and the second portion of the signal, and estimate a location of the mobile station based on the simultaneous or concurrent analysis.

In an embodiment, the mobile station comprises a mobile phone, direction-providing device or portable computer. The estimation of the location can include refining an initial estimate of the location based on the simultaneous or concurrent analysis. The wireless signal can include a GPS, GLONASS, Galileo, QZSS, or BeiDou signal. The instructions, when executed by one or more data processors, further cause the one or more data processors to estimate a location of the antenna in an embodiment. As an example, the location can be estimated based on minimizing a cost function. The instructions, when executed by one or more data processors, further cause the one or more data processors to determine a time difference between a first time when the wireless signal was transmitted from the antenna and a second time when the wireless signal was received at the mobile station in an embodiment. In a particular embodiment, the receiver is further operable to receive a second wireless signal from a second antenna and the simultaneous or concurrent analysis further analyzes the second signal.

According to a particular embodiment of the present invention, a non-transitory computer-readable storage medium comprising a plurality of computer-readable instructions tangibly embodied on the computer-readable storage medium is provided, which, when executed by one or more data processors, cause the one or more data processors to: access a first portion of a wireless signal, the first portion having originated at a first satellite and having been received at a mobile station at a first time, access a second portion of the wireless signal, the first portion having originated at a second satellite and having been received at a mobile station at a second time, the second time being different than the first time, and estimate a location of the mobile station based on a simultaneous or concurrent analysis of the first portion, the second portion, and the first time or second time.

According to another particular embodiment of the present invention, a method for localization using satellite navigation signals in a DAS is provided. The method includes accessing a first portion of a wireless signal, the first portion having originated at a first satellite and having been received at a mobile station at a first time, accessing a second portion of the wireless signal, the first portion having originated at a second satellite and having been received at a mobile station at a second time, the second time being different than the first time, and estimating a location of the mobile station based on a simultaneous or concurrent analysis of the first portion, the second portion, and the first time or second time.

According to a specific embodiment, a mobile station for localization using satellite navigation signals in a DAS is provided. The mobile station includes a receiver operable to: receive a first wireless signal from a first antenna at a first time, the first signal including a first portion having originated at a satellite and receive a second wireless signal from a second antenna at a second time, the second signal including a second portion having originated at the satellite. The mobile station also includes a non-transitory computer-readable storage medium comprising a plurality of computer-readable instructions tangibly embodied on the computer-readable storage medium, which, when executed by one or more data processors, cause the one or more data processors to: simultaneously or concurrently analyze the first portion of the first signal and the second portion of the second signal and estimate a location of the mobile station based on the simultaneous or concurrent analysis. The mobile station can include a mobile phone, direction-providing device or portable computer. The estimation of the location can include refining an initial estimate of the location based on the simultaneous or concurrent analysis. Each of the first wireless signal or the second wireless signal can include a GPS, GLONASS, Galileo, QZSS, or BeiDou signal. The instructions, when executed by one or more data processors, can further cause the one or more data processors to estimate a location of the first antenna and a location of the second antenna. The location can be estimated based on minimizing a cost function. The instructions, when executed by one or more data processors, can further cause the one or more data processors to determine a first time difference between a third time when the first wireless signal was transmitted from the first antenna and the first time and a second time difference between a fourth time when the second wireless signal was transmitted from the second antenna and the second time. Additionally, in an embodiment, the first signal includes a third portion having originated from a second satellite, the second signal includes a fourth portion having originated from the second satellite, and the third and fourth portions are further analyzed during the simultaneous or concurrent analysis.

According to another specific embodiment of the present invention, a method for localization using satellite navigation signals in a DAS is provided. The method includes accessing a first signal received from a first antenna, the first signal including a first portion having originated at a satellite and having been received at a mobile station at a first time, accessing a second signal received from a second antenna, the second signal including a second portion having originated at the satellite and having been received at the mobile station at a second time, and estimating a location of the mobile station based on a simultaneous or concurrent analysis of the first portion, the second portion, the first time and the second time.

According to an embodiment of the present invention, a non-transitory computer-readable storage medium comprising a plurality of computer-readable instructions tangibly embodied on the computer-readable storage medium is provided, which, when executed by one or more data processors, cause the one or more data processors to: access a first signal received from a first antenna, the first signal including a first portion having originated at a satellite and having been received at a mobile station at a first time, access a second signal received from a second antenna, the second signal including a second portion having originated at the satellite and having been received at the mobile station at a second time, and estimate a location of the mobile station based on a simultaneous or concurrent analysis of the first portion, the second portion, the first time and the second time.

According to another embodiment of the present invention, a system for localization using satellite navigation signals in a DAS is provided. The system comprises a DRU operable to: generate a signal by effecting a processing, wherein generating the signal comprises concatenating multiple signal elements together, transmit the signal to a destination, analyze the signal elements to estimate a location of the destination, compare the first location to a known location of the destination, and modify the processing based on the comparison.

The system can also include an OAAU operable to receive a satellite navigation signal from a satellite, and route the satellite navigation signal to the DRU, wherein the generated signal includes the satellite navigation signal. The system may additionally include a digital access unit (DAU) configured to: receive the satellite navigation signal from the OAAU and transmit the satellite navigation signal to the DRU. In an embodiment, the OAAU is connected to the DAU via an Ethernet cable, Optical Fiber, or Wireless Link. The system can further include a plurality of local DAUs coupled together via an Ethernet cable, Optical Fiber, or Wireless Link. The processing can include introducing a delay to a received signal. The DRU can be further operable to determine a delay amount based on a feedback loop utilizing a known location of the destination. The signal can include a GPS, GLONASS, Galileo, QZSS, or BeiDou signal. The DRU can be further configured to generate a second signal by effecting a second processing, the second processing differing from the processing. The DRU can be further configured to transmit the second signal to a second destination. As an example, the first signal element of the multiple signal elements can originate from a first satellite and a second signal element from the multiple signal elements can originate from a second satellite.

According to yet another embodiment of the present invention, a method for localization using satellite navigation signals in a DAS is provided. The method includes accessing a signal generated at a DRU, the signal being generated by effecting and a processing and concatenating multiple signal elements together, extracting the signal elements from the signal, and analyzing the signal elements to estimate a location of the destination. The method further includes comparing the first location to a known location of the destination and identifying a modification to the processing based on the comparison.

According to an embodiment of the present invention, a non-transitory computer-readable storage medium comprising a plurality of computer-readable instructions tangibly embodied on the computer-readable storage medium is provided, which, when executed by one or more data processors, cause the one or more data processors to: access a signal generated at a DRU, the signal being generated by effecting and a processing and concatenating multiple signal elements together, extract the signal elements from the signal, analyze the signal elements to estimate a location of the destination, compare the first location to a known location of the destination, and identify a modification to the processing based on the comparison.

Numerous benefits are achieved by way of the present invention over conventional techniques. Disclosed techniques can enable position estimation to have a precision higher than is typically available in in-door environments. For example, as compared to a process that merely estimates a user as being co-located with an Off-Air GPS Repeater (and thereby sacrificing position accuracy and precision), these techniques can estimate a mobile station's location even between Off-Air GPS Repeaters. Further, by optically transporting GPS signals from OAAUs to DAUs, multiple GPS signals from multiple Off-Air Access Units can be collectively analyzed. Additionally, embodiments enable the routing of the OAAU signals to one or more remote locations. Utilizing multiple GPS signals from multiple OAAUs can provide enhanced indoor localization accuracy.

Accurate and precise location estimation can be useful in a variety of contexts. For example, a mobile station can automatically transmit the estimated location to emergency contacts (e.g., First Response providers (911)), such that a user can be quickly and accurately located. For another example, accurate and precise real-time locating systems (RTLS) can also enable a plethora of mobile commerce applications in commercial centers, shopping malls, theme parks, etc. Not only do the general multi-signal techniques provide relatively accurate location estimations, but a feedback mechanism can be further utilized to ensure accuracy. One exemplary feedback mechanism involves use of a GPS receiver at the remote location in a closed loop with the DRU broadcast of Off-Air GPS signals. Any significant error between the DRU broadcast GPS position and the stored predefined GPS position can trigger a feedback response or an alarm (e.g., that notifies equipment maintenance staff of a potential problem). These and other embodiments of the invention along with many of its advantages and features are described in more detail in conjunction with the text below and attached figures.

DETAILED DESCRIPTION OF SPECIFIC EMBODIMENTS

A distributed antenna system (DAS) provides an efficient means of transporting signals between local units and remote units. The DAS network comprises one or more digital access units (DAUs) that function as the interface between the Off-Air Access Units (OAAU) and the digital remote units (DRUs). The DAUs can be collocated with the OAAUs. The DRUs can be daisy chained together and/or placed in a star configuration and provide coverage for a given geographical area. The DRUs are typically connected with the DAUs by employing a high-speed optical fiber link; however, it will be appreciated that the link between DRUs and DAUs can be made with other types of transport, including but not limited to wireless links, Ethernet cables and other metal connections. This approach facilitates transport of the RF signals from the OAAU to a remote location or area served by the DRUs.

OAAUs communicate with one of more GPS Satellites over the air. OAAUs are convenient for relaying GPS signals between locations that are not well covered by the GPS Satellite itself. A typical OAAU receives the Downlink RF GPS signal from a Satellite, amplifies and filters the RF signal and transports it to a DRU for a given coverage area. Each OAAU utilizes a directional antenna to communicate with a distinct subset of GPS Satellites. Typically, a minimum of 3 GPS Satellites are used to triangulate and determine the receiver's position. The relative time-delays between the 3 GPS Satellites provide a means of identifying the 2D position of the receiver. 4 GPS Satellite signals will provide 3D localization of the receiver. Directional antennas are used at the OAAUs in order to separate the 3 or more Satellite signals.

Each GPS Satellite signal will be time multiplexed in a data transport frame structure and sent to the remote DRUs. It is assumed that the DRUs position is known a-priori. The DRU's will receive the independent GPS satellite signals, which are independently time-delayed, for example, by a user, in order to replicate the GPS position of the DRUs. The GPS positional information of each DRU can be determined from a 3D map of the given indoor venue. One embodiment of the present invention enables a GPS receiver to be incorporated in both the DRU as well as the OAAUs. The absolute GPS position of the DRUs can be obtained be using the OAAU GPS position information and then adjusting it to the 3D position offset inside the venue (e.g., $4^{th}$ floor, 30 m North, 10 m West). Locating a GPS receiver at the DRU will provide a feedback mechanism of ensuring the accuracy of the user-established time-delays in some embodiments.

Figure 1:
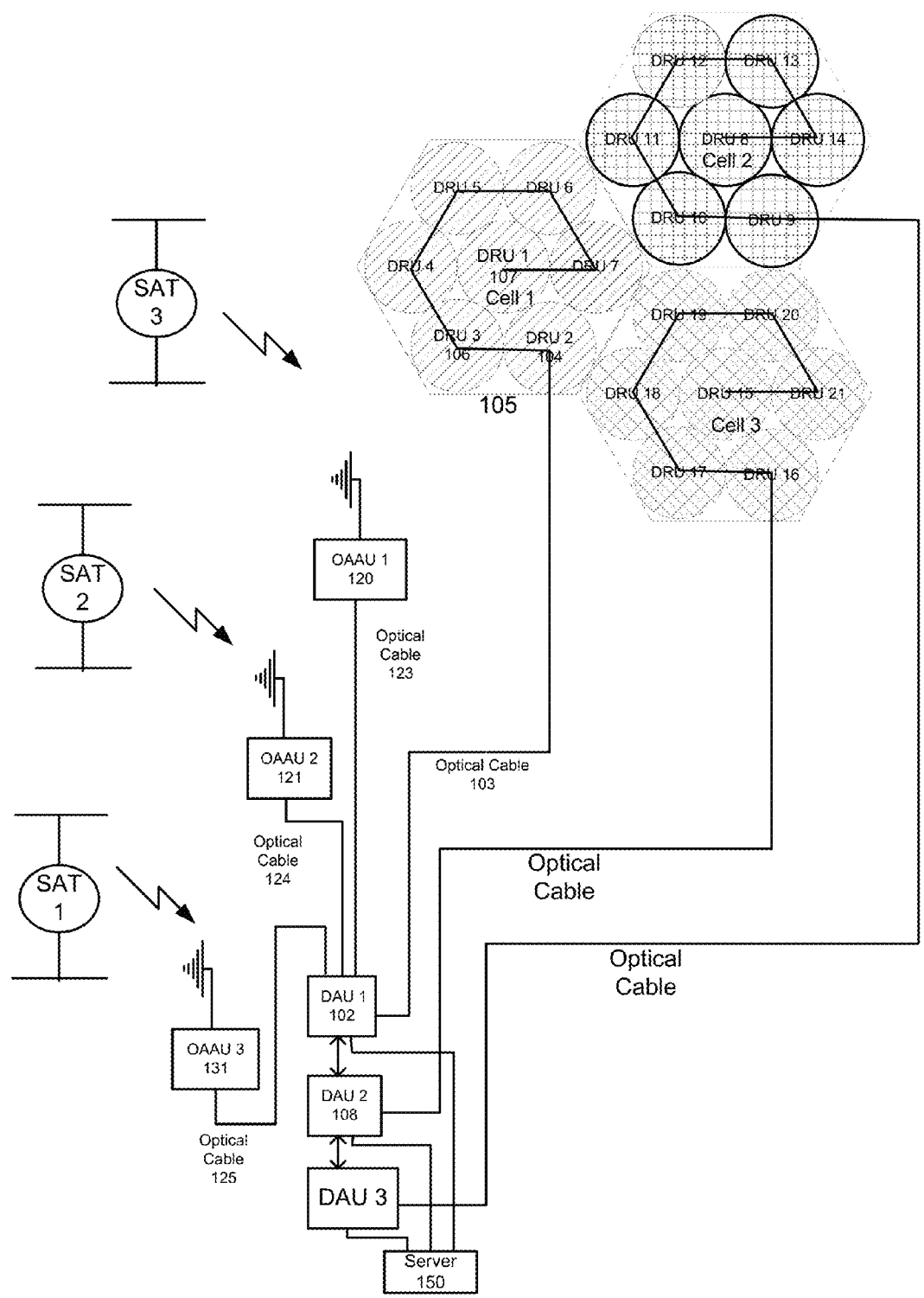
FIG. 1 is a high-level schematic diagram illustrating a basic structure and an example of transport routing based on having a 3 GPS satellites with 3 Digital Access Units (DAUs) at a local location, 3 Off-Air Access Units (OAAUs) at a local location and Digital Remote Units (DRUs) at a remote location according to an embodiment of the present invention. In this embodiment, 3 OAAUs are connected to a DAU at the local location.

FIG. 1 illustrates a DAS network architecture according to an embodiment of the present invention and provides an example of a data transport scenario between 3 GPS Satellites, multiple OAAUs, multiple local DAUs, and multiple DRUs. GPS Satellites 1, 2 and 3 are connected to OAAU 1 (120), OAAU 2 (121), and OAAU 3 (131), respectively, by wireless links in the illustrated embodiment. DAUs 1 (102), (108) and DAU 3 route OAAU signals to the various DRUs. Each of the local DAUs is connected to server (150). In this embodiment, the OAAUs are connected in a star configuration with DAU (102) using optical cables (i.e., optical fibers). Although three satellites are illustrated in FIG. 1, the illustrated three satellites are shown merely as an example and it will be appreciated that additional satellites (e.g., 4, 5, or more satellites) in the constellation can be utilized by embodiments of the present invention. In the following figures, three exemplary satellites are illustrated, but the embodiments illustrated in the following figures are not limited to the use of only three satellites. One of ordinary skill in the art would recognize many variations, modifications, and alternatives.

One feature of embodiments of the present invention is the ability to route the GPS Satellite signals among the DAUs and DRUs. In order to route GPS signals available from one or more Satellites, it is desirable to configure the individual router tables of the DAUs and DRUs in the DAS network. This functionality is provided by embodiments of the present invention.

The DAUs are networked together to facilitate the routing of signals among multiple DAUs. This architecture enables the various GPS Satellite signals to be transported simultaneously or concurrently to and from multiple DAUs. PEER ports are used for interconnecting DAUs in some implementations.

The DAS network can include a plurality of OAAUs, DAUs and DRUs. The DAU communicates with the network of DRUs and the DAU sends commands and receives information from the DRUs. The DAUs include physical nodes that accept and deliver RF signals and optical nodes that transport data. A DAU can include an internal server or an external server. The server is used to archive information in a database, store the DAS network configuration information, and perform various data related processing among other functions.

Additionally, each OAAU can communicate with a DAU. The OAAU receives commands from the DAU and delivers information to the DAU. The OAAUs include physical nodes that accept GPS RF signals and optical nodes that transport data.

Figure 2A:
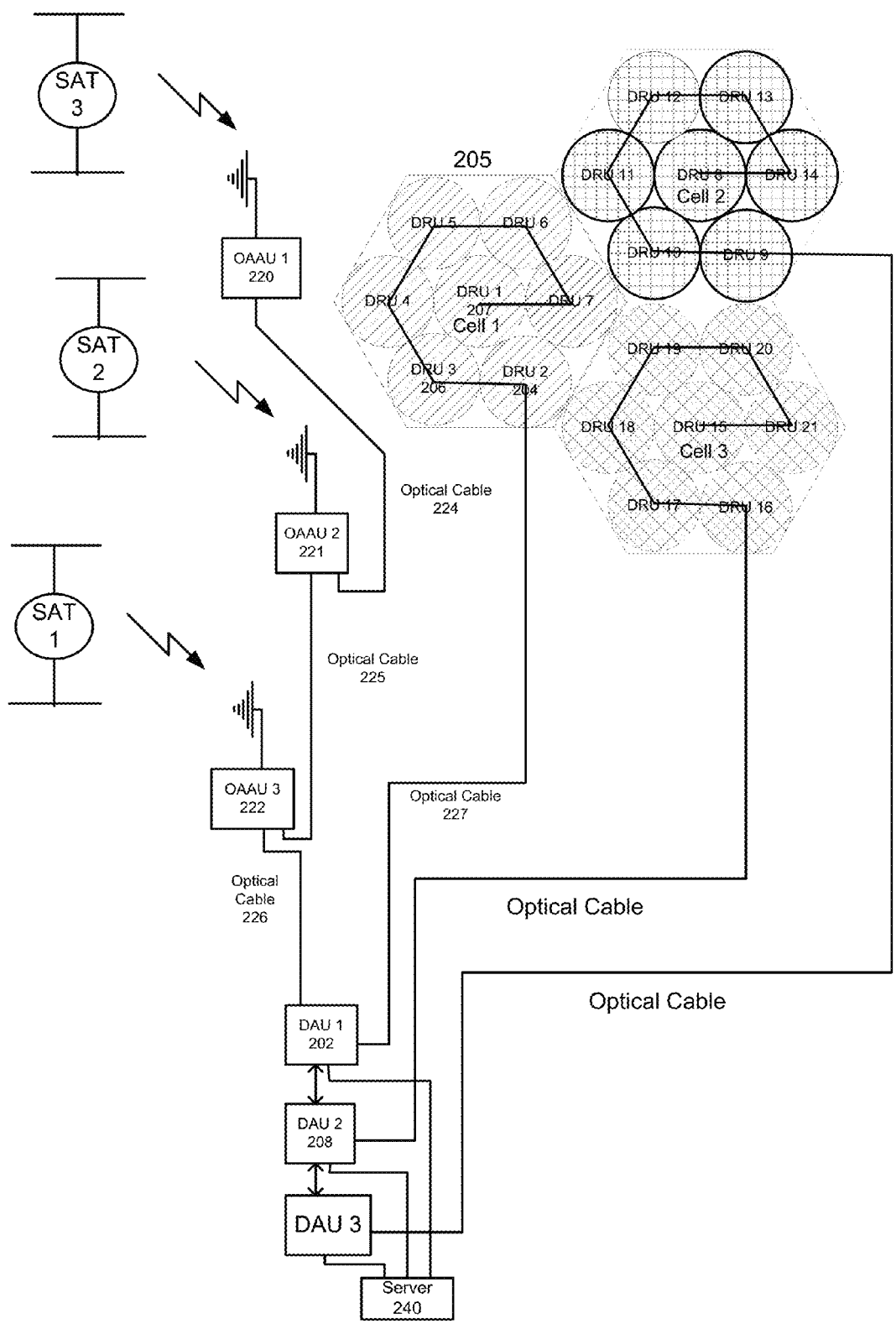
FIG. 2A high-level schematic diagram illustrating a basic structure and an example of the transport routing based on having a 3 Satellites with 3 DAUs at a local location, 3 OAAUs daisy chained together at a local location and optical interfaces to DRUs at the remote locations according to an embodiment of the present invention.
Figure 2B:
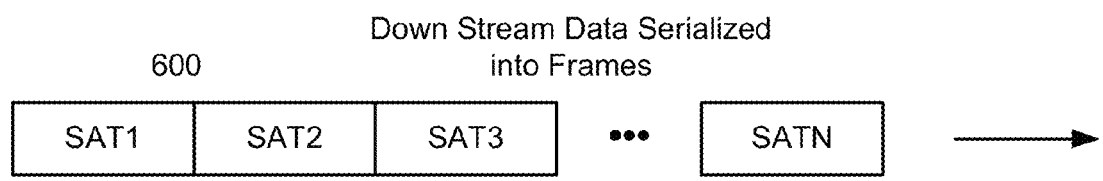
FIG. 2B illustrates a data transport structure whereby the various Satellite GPS signals are time-multiplexed into a frame according to an embodiment of the present invention.

As shown in FIG. 2A, individual GPS signals from Satellites SAT 1, SAT 2 and SAT 3 are transported to a daisy-chained network of OAAUs. FIG. 2 demonstrates how three independent Satellites, each Satellite communicating with an independent OAAU, provide input into a single DAU (202). A server (240) is utilized to control the routing function provided in the DAS network. Referring to FIG. 2A and merely by way of example, DAU 1 (202) receives downlink GPS signals from the daisy-chained network of OAAUs (220, 221, 222). OAAU 1 (220) translates the RF signals to optical signals for the downlink. The optical fiber cable (224) transports the SAT 1 signals between OAAU 1 (220) and OAAU 2 (221). The optical signals from OAAU 1 (220) and OAAU 2 (221) are multiplexed on optical fiber (225). The other OAAUs in the daisy chain are involved in passing the optical signals onward to DAU 1 (202). DAU 1 (202) DAU 2 and DAU 3 transport the optical signals to and from the network of DRUs. As shown in FIG. 2B, the various GPS signals from the Satellites are time multiplexed into a data stream for transporting throughout the DAS network. Another embodiment of the present invention includes the use of RF connections between the OAAUs and the DAUs. In this embodiment the OAAU will receive the RF signals from the GPS Satellite and transport the RF signal to a DAU using an RF cable.

Figure 3:
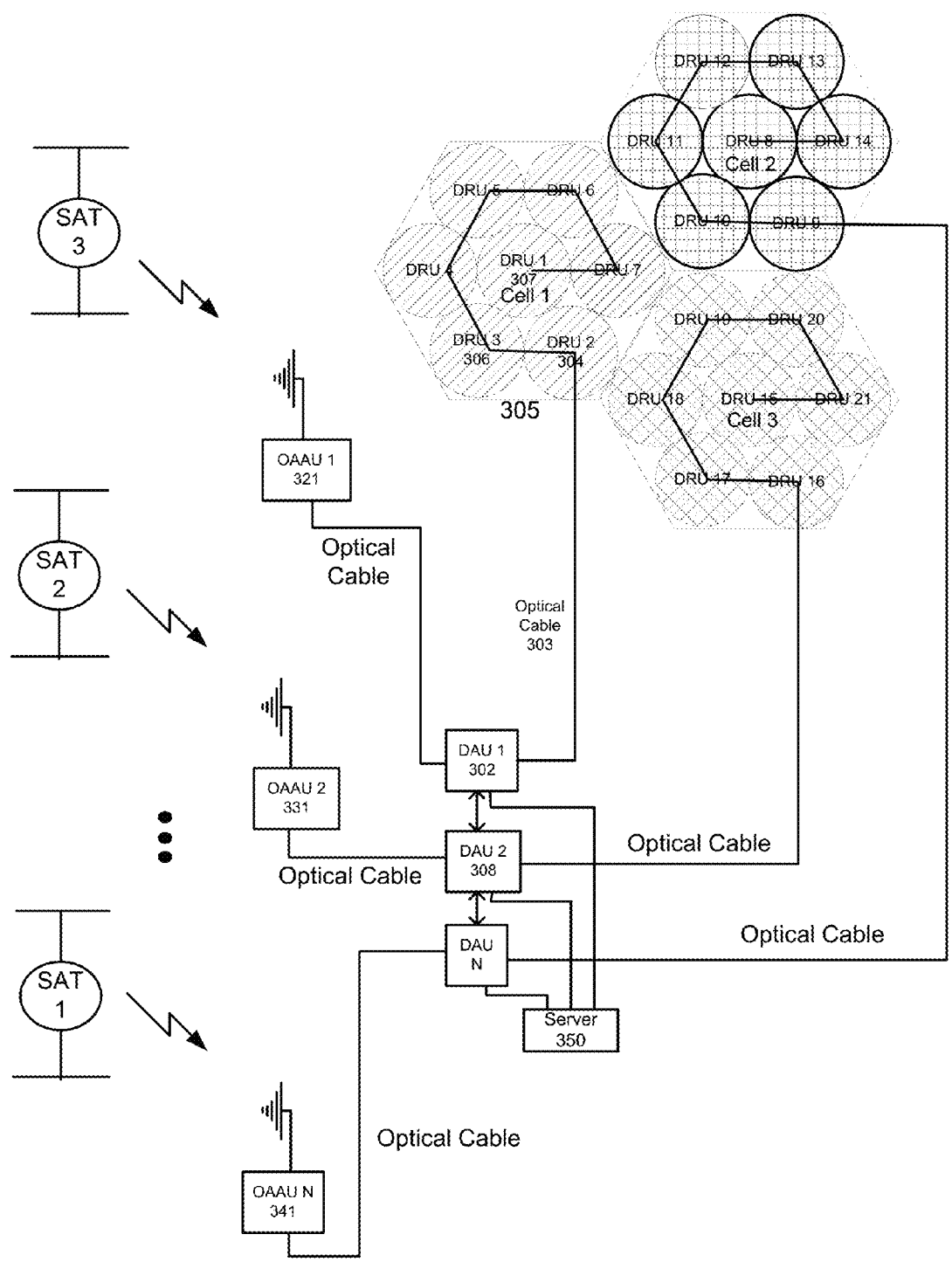
FIG. 3 is a high-level schematic diagram illustrating a basic structure and an example of a transport routing based on having multiple OAAUs at local locations with multiple DAUs at a local location, and multiple DRUs at a remote location and optical interfaces to the Remotes according to an embodiment of the present invention.

FIG. 3 depicts a DAS system employing multiple OAAUs at a local location and multiple DRUs at a remote location. In accordance with the illustrated embodiment, each DRU provides unique information associated with each DRU, which uniquely identifies data received by a particular DRU. In this embodiment, individual OAAUs are independently connected to DAUs. Another embodiment of the present invention includes the use of RF connections between the OAAUs and the DAUs. In this alternative embodiment, the OAAU will receive the RF signals from the GPS Satellite and transport the RF signals to a DAU using an RF cable.

The servers illustrated herein, for example, server (350) provide unique functionality in the systems described herein. The following discussion related to server (350) may also be applicable to other servers discussed herein and illustrated in the figures. Server (350) can be used to set up switching matrices to allow the routing of signals between the remote DRUs. The server (350) can also store configuration information. For example, if the system is powered down or one DRU or OAAU goes off-line, the system may need to be reconfigured following a subsequent power up. The server (350) can store the information used in reconfiguring the system and/or the DRUs, OAAUs or DAUs.

Figure 4:
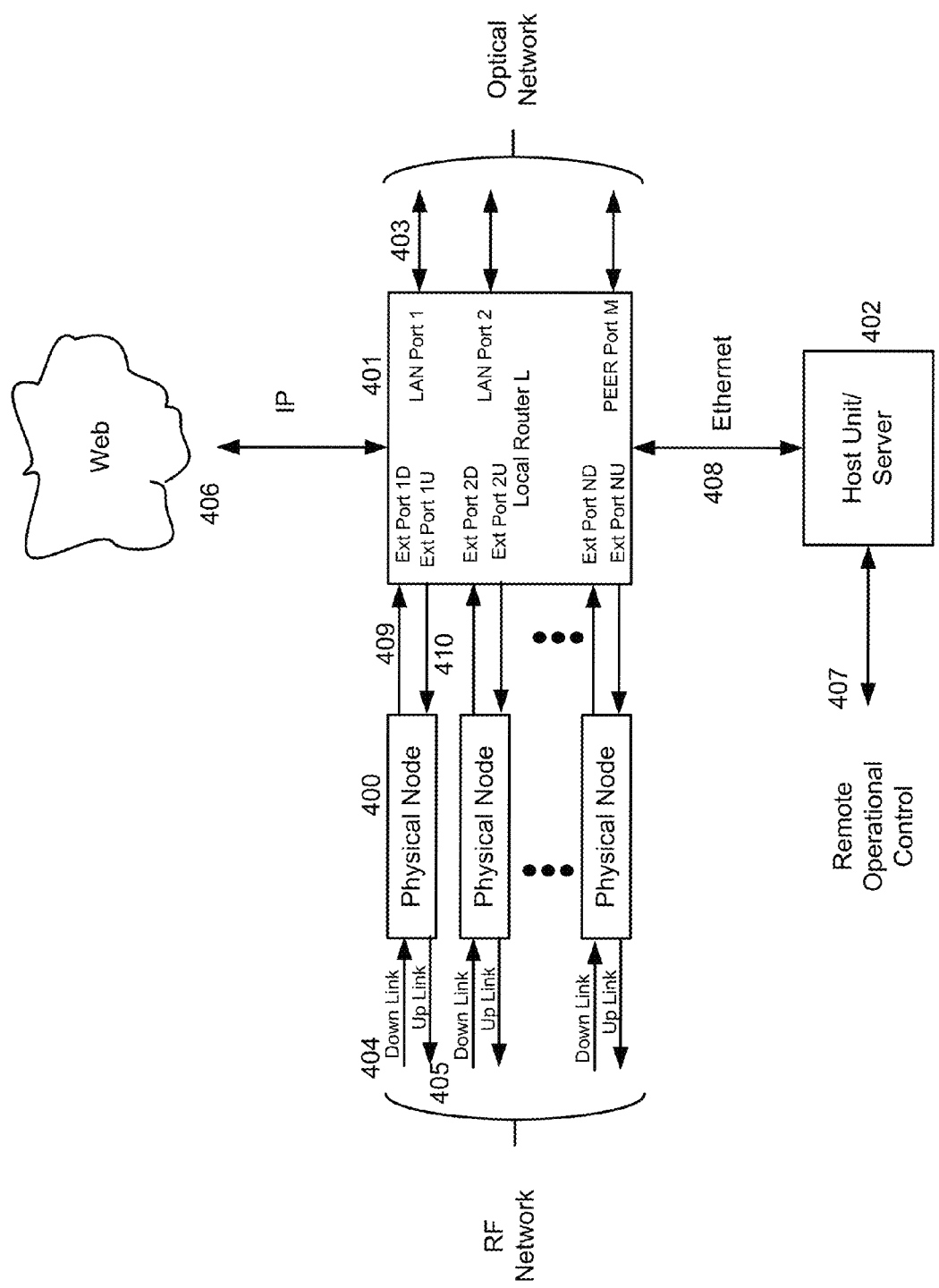
FIG. 4 is a high-level schematic diagram illustrating a DAU, which contains physical Nodes and a Local Router, according to an embodiment of the present invention.

FIG. 4 shows two elements in a DAU: the Physical Nodes (400) and the Local Router (401). The Physical Nodes translate RF signals to baseband for the Downlink. The local Router directs traffic between the various LAN Ports, PEER Ports and the External Ports. The physical nodes can connect to the OAAUs at radio frequencies (RF). The physical nodes can be used for different Satellite connections.

FIG. 4 shows an embodiment whereby physical nodes have separate inputs for the downlink paths (404). The physical node translates the signals from RF to baseband for the downlink path. The physical nodes are connected to a local Router via external ports (409,410). The router directs the uplink data stream from the LAN and PEER ports to the selected External U ports. Similarly, the router directs the downlink data stream from the External D ports to the selected LAN and PEER ports.

In one embodiment, the LAN and PEER ports are connected via an optical fiber to a network of DAUs and OAAUs. The network connection can also use copper interconnections such as CAT 5 or 6 cabling, or other suitable interconnection equipment. The DAU is also connected to the internet network using IP (406). An Ethernet connection (408) is also used to communicate between the Host Unit and the DAU. The DRU and OAAU can also connect directly to the Remote Operational Control center (407) via the Ethernet port.

Figure 5:
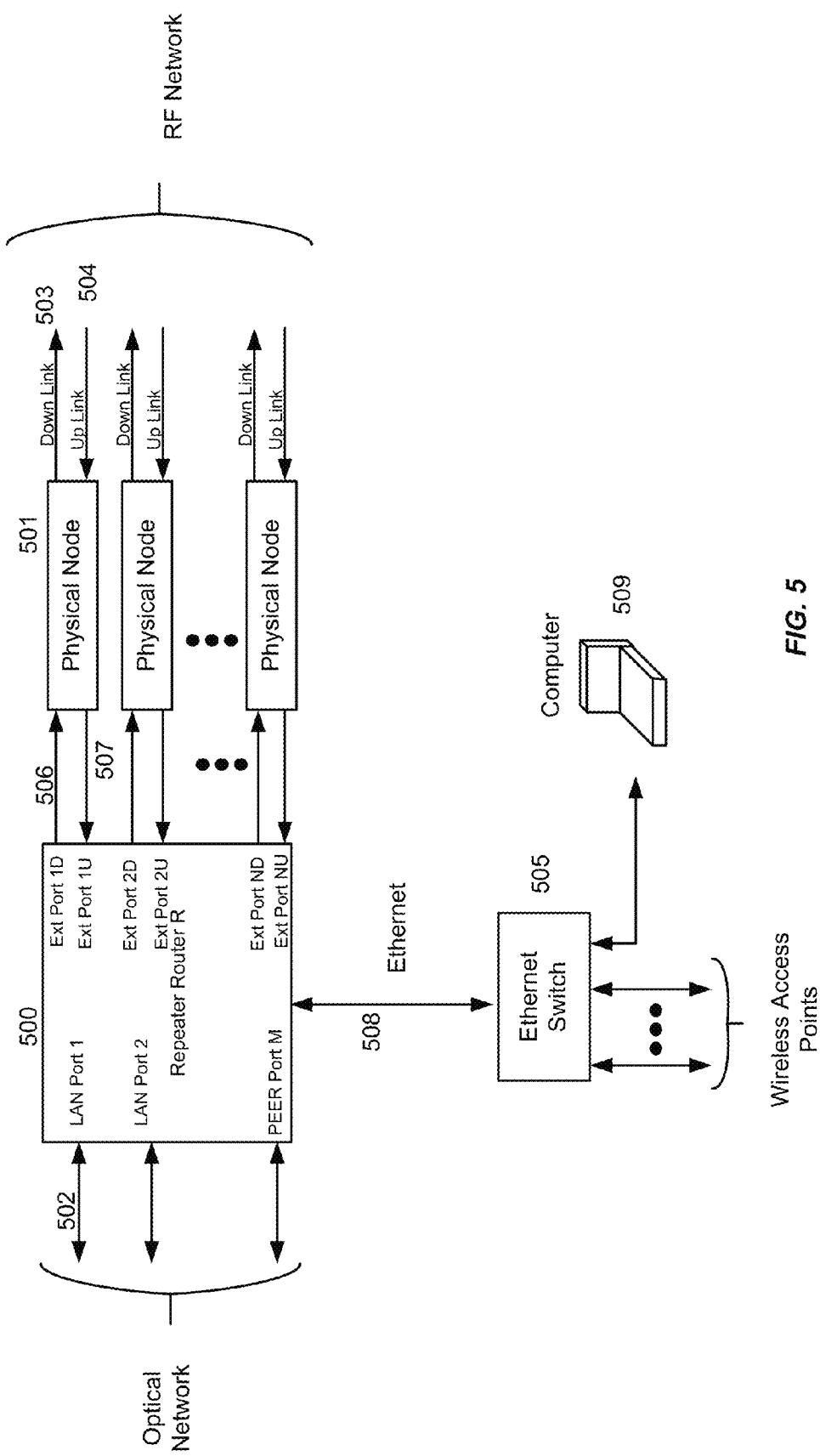
FIG. 5 is a high-level schematic diagram an OAAU, which contains physical Nodes and a repeater router, according to an embodiment of the present invention.

FIG. 5 shows two of the elements in an OAAU: the Physical Nodes (501) and the Repeater Router (500). The Repeater Router directs traffic between the LAN ports, External Ports and PEER Ports. The physical nodes connect wirelessly to the GPS Satellite at radio frequencies (RF). The physical nodes can be used for different Satellites, different antennas, etc. FIG. 5 shows an embodiment whereby the physical nodes have separate outputs for the downlink paths (503). The physical node translates the signals from RF to baseband for the downlink path. The physical nodes are connected to a Repeater Router via external ports (506,507). The router directs the downlink data stream from the LAN and PEER ports to the selected External D ports. The OAAU also contains an Ethernet Switch (505) so that a remote computer or wireless access points can connect to the internet.

Figure 6:
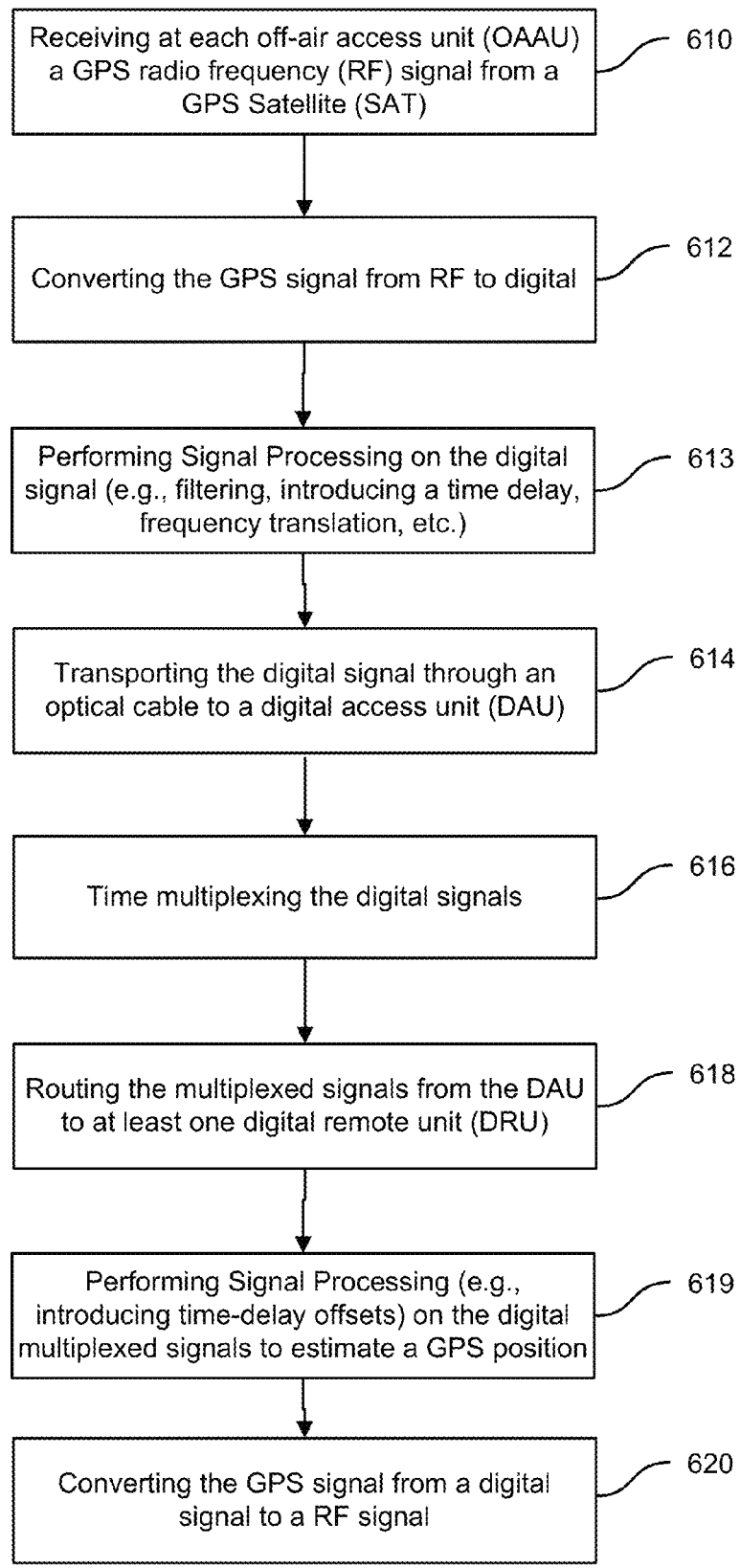
FIG. 6 is a high-level flowchart illustrating a data flow structure between an OAAU and a DAU or another RDU according to an embodiment of the present invention.

FIG. 6 is a simplified flowchart illustrating a method of routing GPS signals from the various Satellites to each DRU according to an embodiment of the present invention. As shown in block (619), the time multiplexed GPS signals from the respective Satellites are time delay offset to replicate the GPS position of the respective DRU. The DRU then broadcasts the GPS signal for detection by the users equipment.

Figure 7:
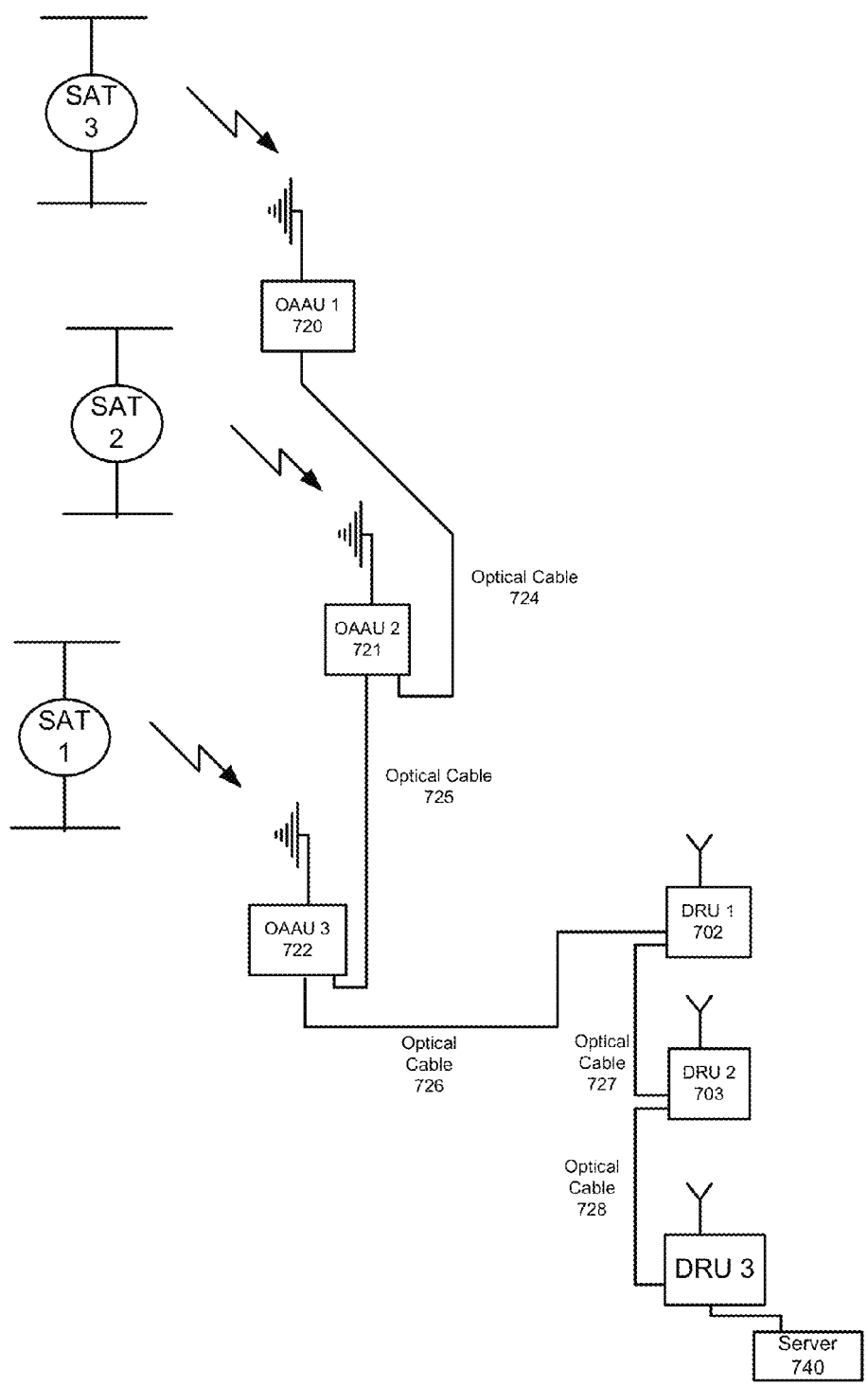
FIG. 7 is a high-level schematic diagram illustrating a basic structure and an example of transport routing based on having multiple OAAUs at local locations with multiple DRUs at a remote location and optical interfaces to the Remotes according to an embodiment of the present invention.

As shown in FIG. 7, individual GPS signals from Satellites SAT 1, SAT 2 and SAT 3 are transported to a daisy-chained network of OAAUs. FIG. 7 demonstrates how three independent Satellites, each Satellite communicating with an independent OAAU, can provide input into a single DRU (702). A server (740) is utilized to control a routing function provided in the DAS network. Referring to FIG. 7 and merely by way of example, DRU 1 (702) receives downlink GPS signals from the daisy-chained network of OAAUs (720, 721, 722). OAAU 1 (720) translates the RF signals to optical signals for the downlink. The optical fiber cable (724) transports the SAT 1 signals between OAAU 1 (720) and OAAU 2 (721). The optical signals from OAAU 1 (720) and OAAU 2 (721) are multiplexed on optical fiber (725). The other OAAUs in the daisy chain are involved in passing the optical signals onward to DRU 1 (702). DRU 1 (702)

DRU 2 and DRU 3 transport the optical signals to and from the network of DRUs in a daisy chain configuration.

Figure 8:
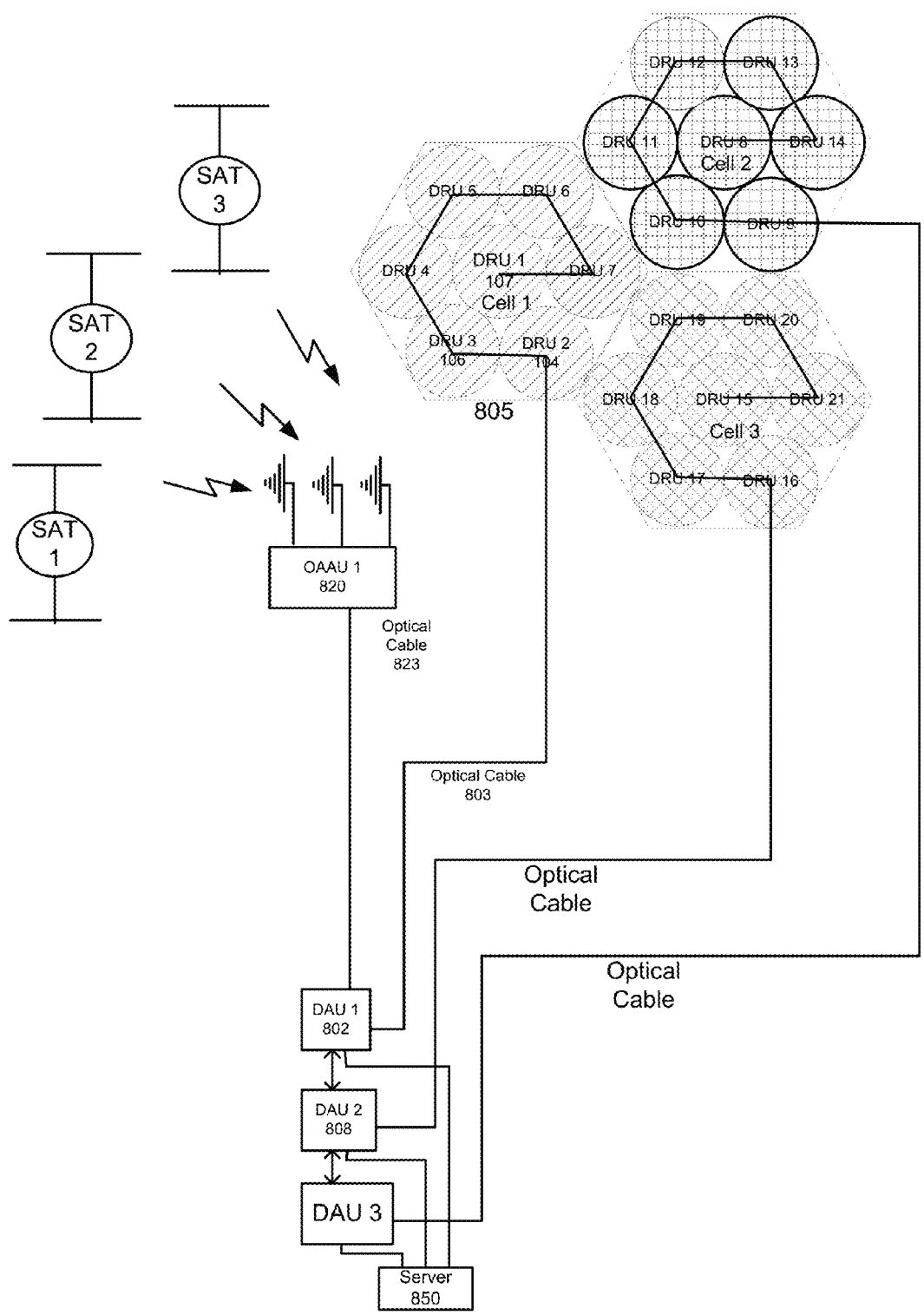
FIG. 8 is a high-level schematic diagram illustrating a basic structure and an example of transport routing based on a single OAAUs with 3 receivers at the local location with multiple DAUs at a local location, and multiple DRUs at a remote location and optical interfaces to the Remotes according to an embodiment of the present invention.

As shown in FIG. 8, the individual GPS signals from Satellites SAT 1, SAT 2 and SAT 3 are transported to a single OAAU with multiple directional antennas. FIG. 8 demonstrates an architecture in which three independent Satellites are utilized, each Satellite communicating with an independent RF receiver in the OAAU (820). The OAAU (820) time-multiplexes the independent GPS signals to the DAS network as shown in FIG. 8.

Figure 9:
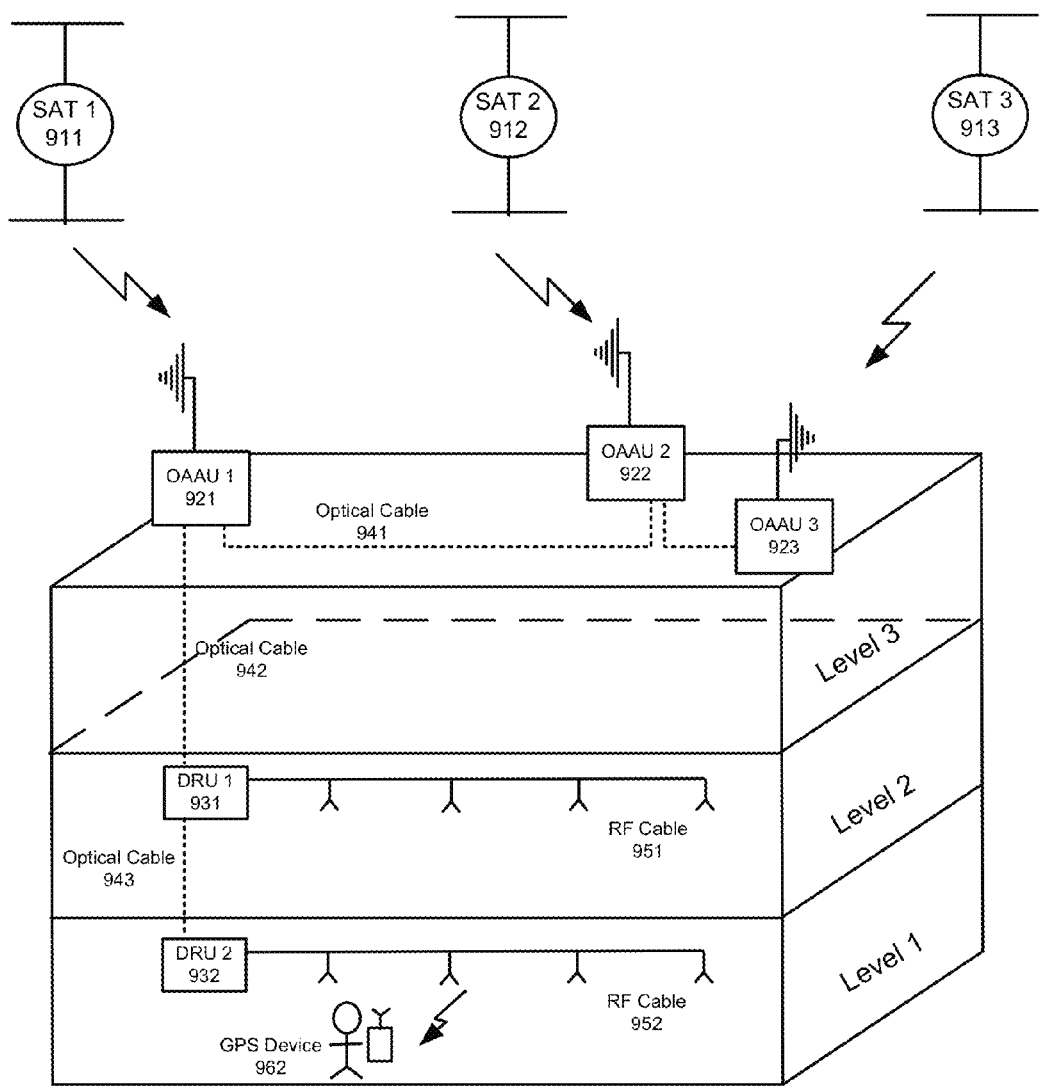
FIG. 9 illustrates a conceptual building layout showing 2 OAAUs receiving GPS signals from a subset of Satellites and transporting those signals to a DRU via optical cables according to an embodiment of the present invention. The remote signals at the DRUs are broadcast over the antennas and received by a GPS receiver in this embodiment.

FIG. 9 shows an embodiment of a system used in a three-level building. The present invention is not limited to three levels and can be applied to buildings with additional or fewer levels. OAAUs are located on a roof of the building and in line of sight of the Satellites. Directional antennas are used at the OAAUs in order to limit the number of Satellite GPS signals captured by each OAAU. The objective is to separate the Satellite GPS signals at each OAAU. The GPS signals are multiplexed on the optical fiber (941), (942) and transported to DRU 1 (931) and DRU 2 (932). The GPS signals are de-multiplexed at each DRU and combined to estimate a position at the respective DRU. The signals are broadcast through the RF antennas connected via RF cables to the DRU. GPS Device (962) receives the signal broadcast from DRU 2 (932) that identifies its position.

Figure 10:
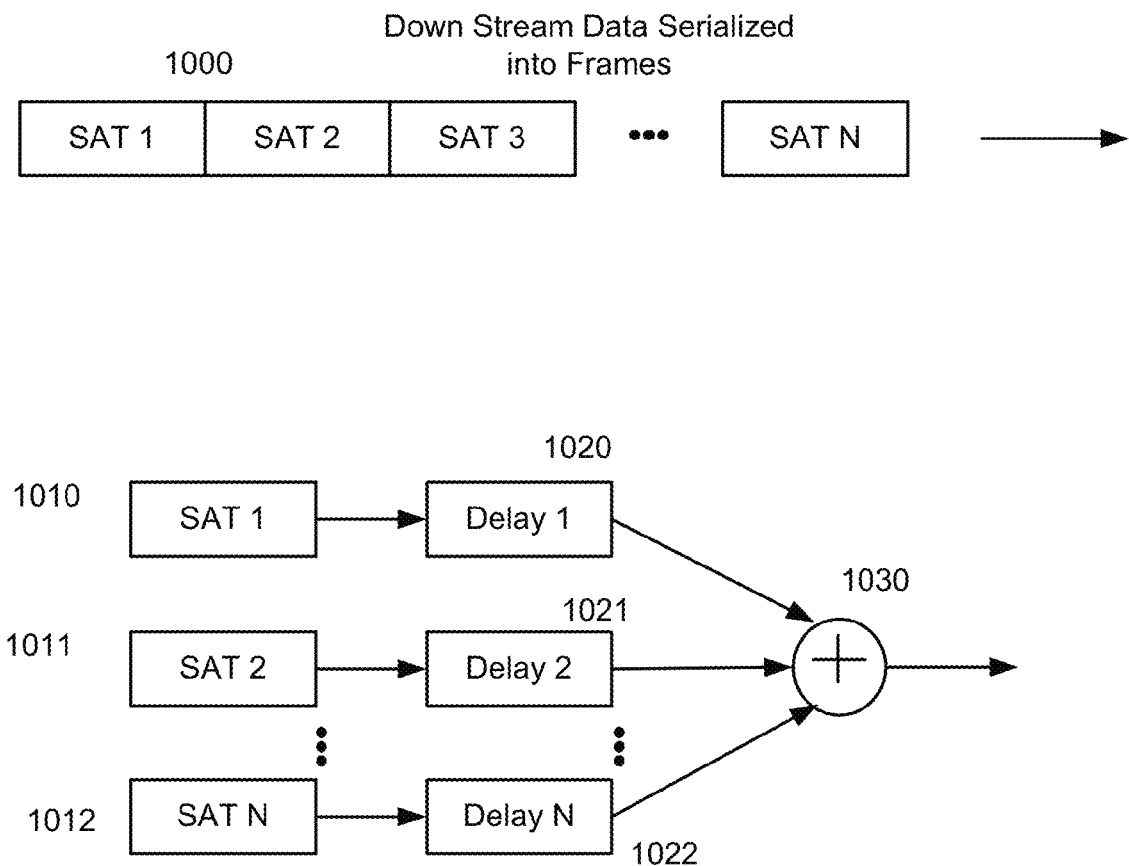
FIG. 10 is a high-level schematic diagram according to one embodiment of the invention illustrating a basic structure whereby OAAU GPS signals on a Frame are time de-multiplexed, delayed relative to one another and then combined.

As shown in FIG. 10, the GPS Satellite down stream data is de-multiplexed and each respective GPS signal is time delayed and summed in order to simulate the position of the DRU. Each DRU transmits the GPS position at the respective DRU. The accuracy of the positional information at the users GPS device is a function of the proximity to the DRU.

Figure 11:
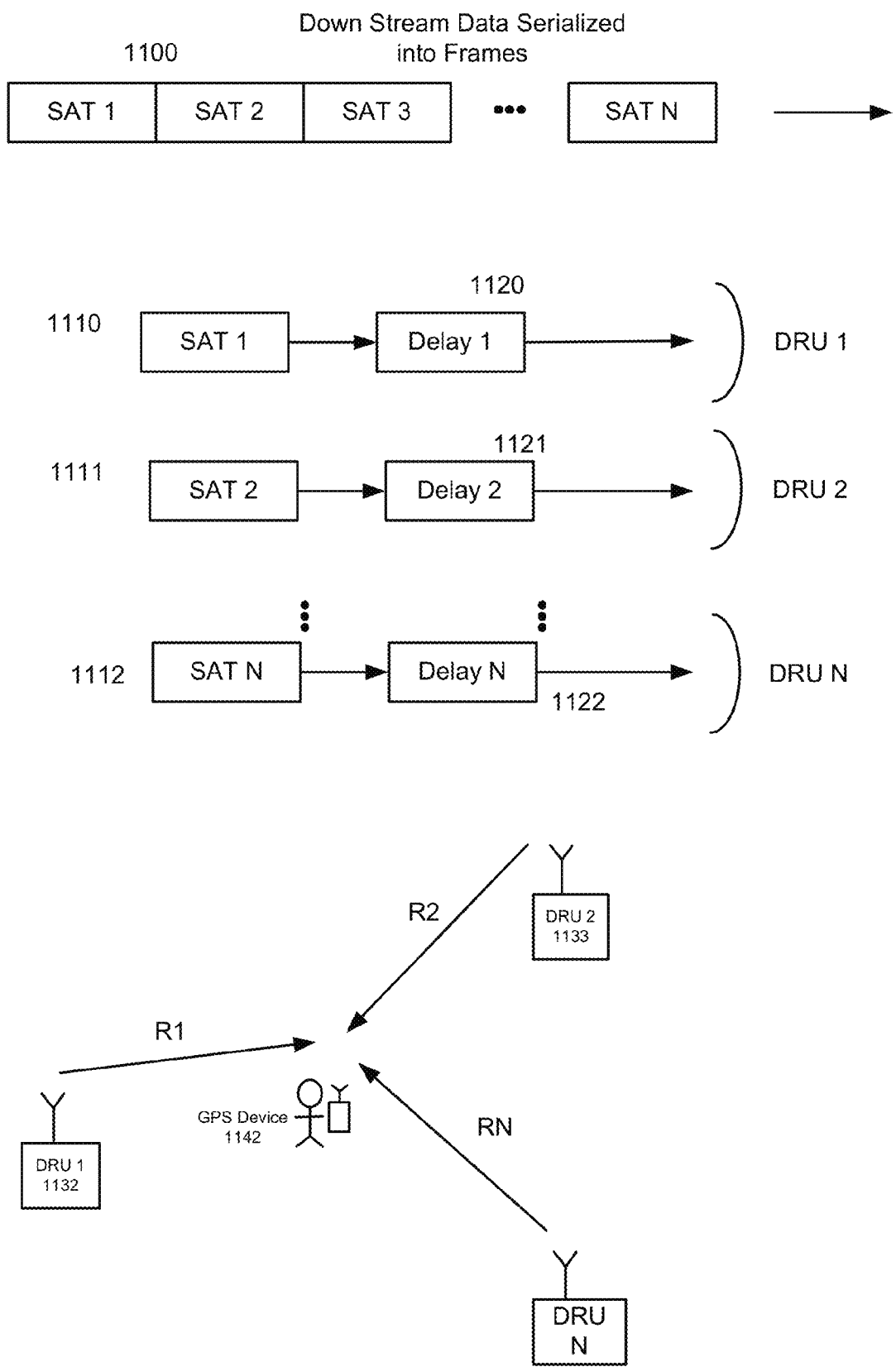
FIG. 11 is a high-level schematic diagram illustrating a basic structure according to an embodiment of the invention whereby a OAAU GPS signal on a Frame is time de-multiplexed, delayed and then transmitted at one of more DRUs according to an embodiment of the present invention. The GPS signals for the individual satellites are transmitted on separate DRUs such that the satellite configuration can be replicated indoors.

As shown in FIG. 11, the GPS Satellite down stream data is de-multiplexed and each DRU time delays and transmits one or more of the respective GPS signals. This embodiment enables triangulation at the users GPS device by replicating the Satellite signals indoors.

Figure 12:
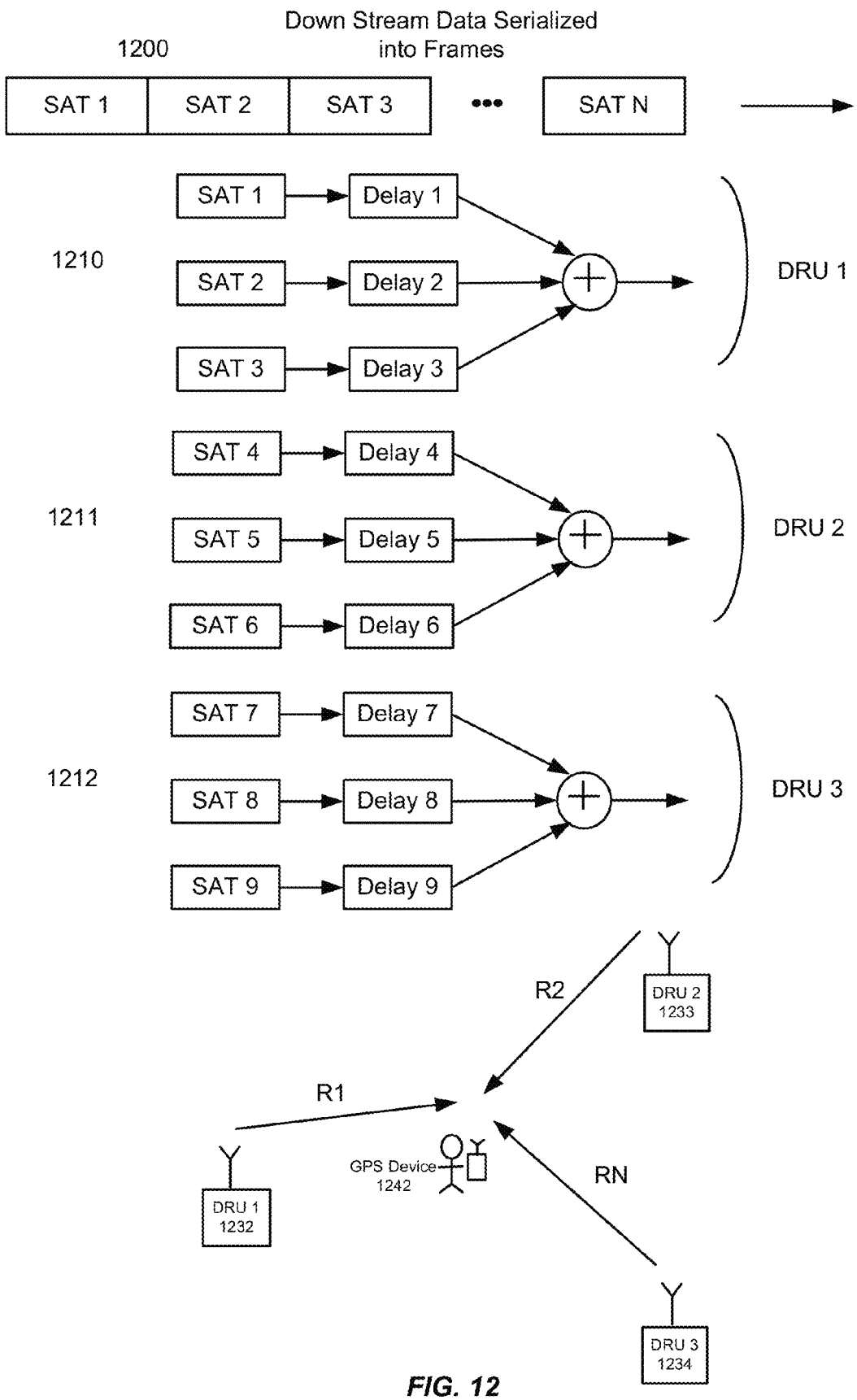
FIG. 12 is a high-level schematic diagram illustrating a basic structure according to an embodiment of the invention whereby OAAU GPS signals on the Frame are time de-multiplexed, delayed relative to one another and then combined according to an embodiment of the present invention. Each DRU is fed a distinct combination of Satellite GPS signals in this embodiment.

As shown in FIG. 12, the GPS Satellite down stream data is de-multiplexed and each DRU time delays and transmits one or more of the respective GPS signals. Each OAAU focuses on a distinct set of satellites. In this embodiment, three distinct satellite GPS signals are received at each of the OAAU and there are three OAAUs. Each DRU transmits a unique set of Satellite GPS signals. This embodiment enables triangulation at the users GPS device by providing three unique GPS locations at the three DRUs. The users GPS device will average the three GPS positions to obtain a more accurate position of the users location.

The position of a GPS receiver is determined by estimating its latitude, longitude and height. Four measurements are tyically used to determine the latitude, longitude, height and eliminate the receiver clock error. The GPS receiver has embedded software that has an algebraic model that describes the geometrical position. For each measurement, an equation of a distance to a satellite, p, can be written that is a function of the satellite position (x,y,z), the GPS receiver position (X,Y,Z) and the clock error. For simplicity, the clock error has been removed from each equation below, since it is common to all equations.

$$p_{1k} = \sqrt{(X-x_1+\Delta_{1k})^2+(Y-y_1+\Delta_{2k})^2+(Z-z_1+\Delta_{3k})^2}$$

$$p_{2k} = \sqrt{(X-x_2+\Delta_{1k})^2+(Y-y_2+\Delta_{2k})^2+(Z-z_2+\Delta_{3k})^2}$$

$$p_{3k} = \sqrt{(X-x_3+\Delta_{1k})^2+(Y-y_3+\Delta_{2k})^2+(Z-z_3+\Delta_{3k})^2}$$

$$p_{Nk} = \sqrt{(X-x_N+\Delta_{1k})^2+(Y-y_N+\Delta_{2k})^2+(Z-z_N+\Delta_{3k})^2}$$

where (X, Y, Z) is the position of the OAAU and $(x_N, y_N, z_N)$ is the position of Satellite N. and $(\Delta_{1k}, \Delta_{2k}, \Delta_{3k})$ are the calculated positional offsets for DRU k.

The position of DRU k is at $(X+\Delta_{1k}, Y+\Delta_{2k}, Z+\Delta_{3k})$.

The set of four or more equations is solved simultaneously to obtain the values for the OAAU position (X,Y,Z). The Cartesian coordinates can be converted to latitude, longitude, and height in any geodetic datum. In general, a procedure known as the Newton-Raphson iteration is used. In this procedure, each of the equations is expanded into a polynomial based on an initial guess of the OAAU position. Iteratively, the four equations are solved simultaneously. If either one of the height, latitude or longitude is known, then only three equations are typically used to resolve for the OAAU position.

The calculated positional offsets, $\Delta$'s, for each DRU can be obtain from the blueprints of the venue and the location of the DRU in the venue. The positional offsets are converted into time delays by dividing by the speed of light. The time delays are applied to signals $(x_1, y_1, z_1)$ as shown in FIG. 10. The resultant signal is transmitted at the DRU and subsequently received by the GPS device.

In some embodiments, the DAU is connected to a host unit/server, whereas the OAAU does not connect to a host unit/server. In these embodiments, parameter changes for the OAAU are received from a DAU, with the central unit that updates and reconfigures the OAAU being part of the DAU, which can be connected to the host unit/server. Embodiments of the present invention are not limited to these embodiments, which are described only for explanatory purposes.

Figure 13:
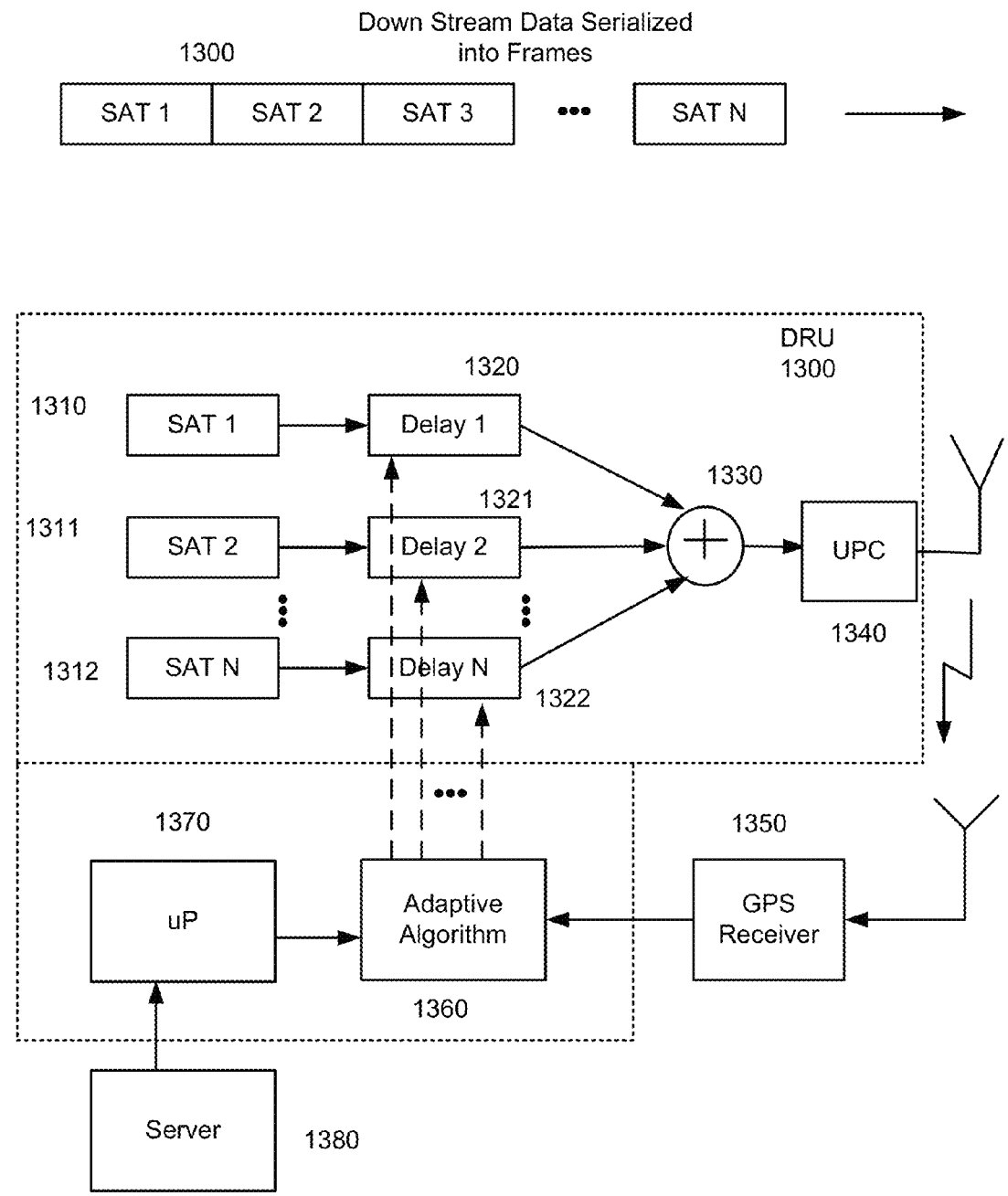
FIG. 13 is a high-level schematic diagram illustrating a DRU GPS transmitter in a feedback loop according to an embodiment of the invention. Feedback can be based on an error between the GPS Receiver position and a predefined position that is stored on the server.

FIG. 13 is a high-level representation of an adaptive GPS repeater system according to an embodiment of the invention that includes a GPS receiver (1350) at the remote location along with the DRU (1300). The DRU contains an Up-Converter (UPC) (1340) that frequency translates baseband signals (1330) to RF signals. The GPS receiver (1350) can ensure that the information being transmitted by the DRU (1300) is accurate. This provides a safety mechanism, whereby, if there is a significant error between the transmitted GPS positional information and the predefined GPS location, an alarm can be effected. The predefined GPS position will be established in the provisioning of the system and stored on the server (1380) as well as in the DRU. An adaptive algorithm (1360) can be used to adjust Delay values (1320,1321,1322) of GPS Satellite signals (1310, 1311,1312). A Microprocessor (1370) in the DRU controls the adaptive algorithm. In one embodiment of this invention, the GPS receiver can be strictly a software program as oppose to needing to translate the baseband DRU signal to RF and then input the signal into the RF receiver front end of the GPS receiver.

Figure 14:
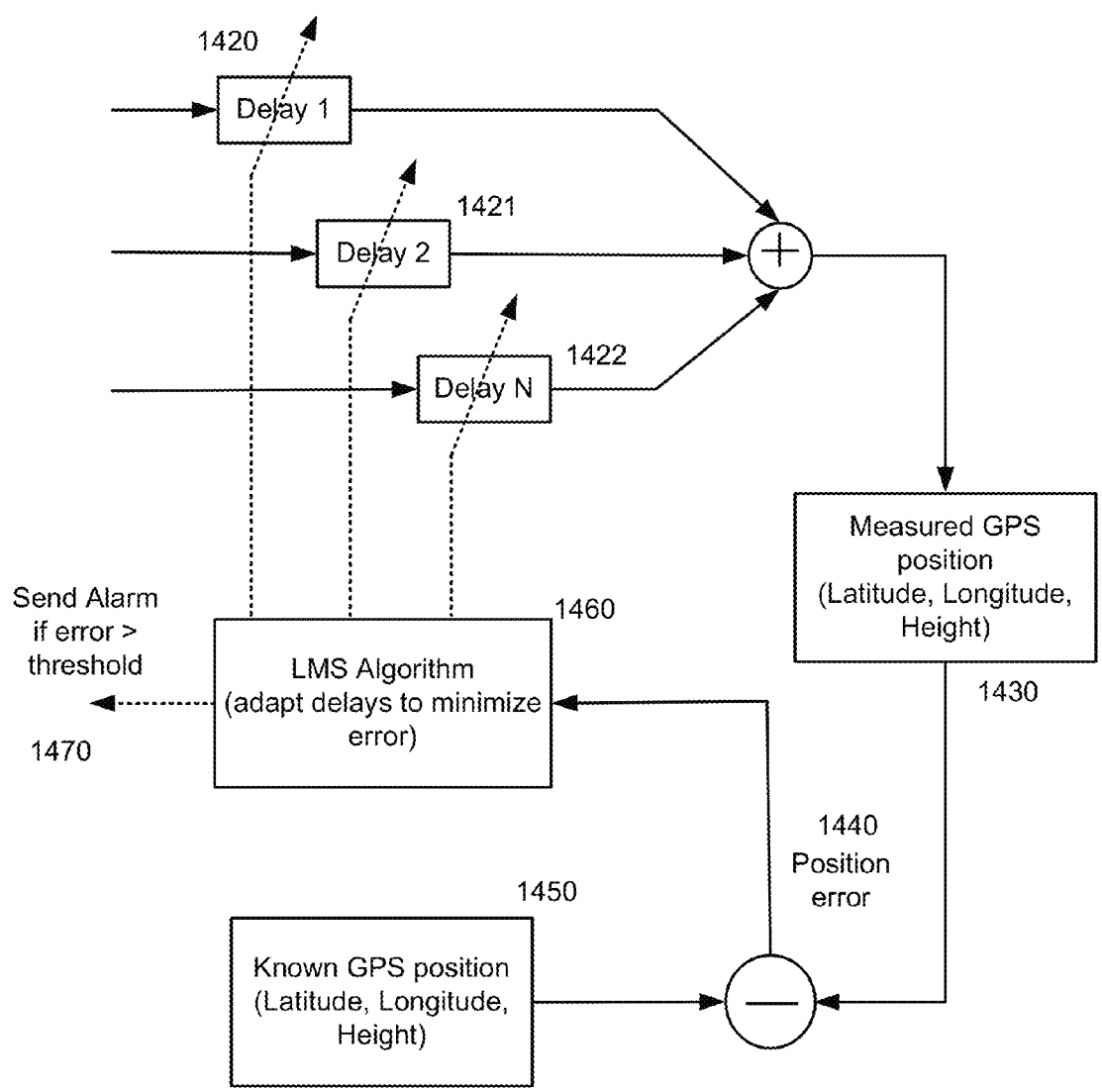
FIG. 14 is a high-level schematic diagram illustrating an adaptive loop according to an embodiment of the invention used to determine Delay values for individual Satellite GPS signals. Position error resulting from a difference between a Measured GPS position and a predefined GPS position can be used to optimize Delays for the various Satellite GPS signals.

FIG. 14 is a high-level representation of a Feedback system according to an embodiment of the invention used to control the Satellite GPS signal Delays (1420,1421,1422). The GPS receiver measures the transmitted GPS signal from the DRU and determines a position (Latitude, Longitude, Height) in block (1430). This position is compared to the known GPS position (1450) that was established during provisioning. The resultant position error (1440) is used to drive an adaptive algorithm such as the Least Mean Squared (LMS) algorithm. The Delays (1420,1421,1422) are adjusted to reduce (e.g., minimize) the resultant position error (1440). In the event that the position error is above a predefined threshold, then an alarm can be activated. This mechanism also serves as a means of calibrating the delays at the time of provisioning. In one embodiment of the invention, once the delays have been determined, then they can be stored in the DRU and the server and no further adaptation is required.

Figure 15:
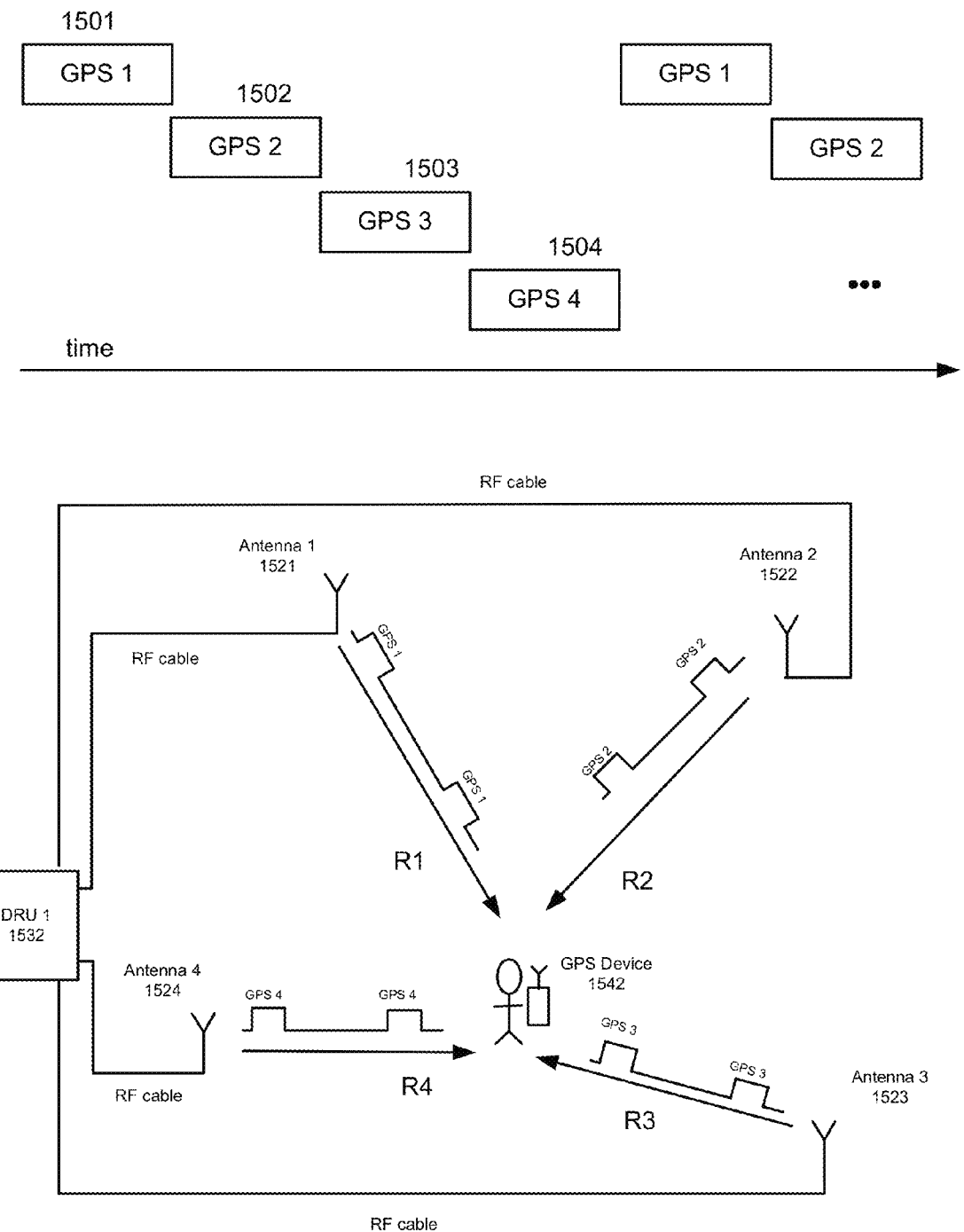
FIG. 15 is a high-level schematic diagram illustrating a system configuration of a time-difference-of-arrival technique according to an embodiment of the invention, whereby, each of 4 antennas transmits its GPS signal during a distinct time frame.

FIG. 15 shows a high-level representation of a system that transmits time-staggered GPS signal. Specifically, satellite signals collected by OAAUs can be transmitted to DRU (1532). DRU (1532) can then further transmit the signals to each antenna. Each antenna can transmit the signals, such that they can be received at a mobile station and used to calculate a position. The mobile station can calculate its position using signal time features and derived locations of signal-transmitting antennas. These antenna locations can be derived based on collective analysis of the satellite signals. However, if the unaltered signals are analyzed, the calculated location of each antenna will be that of the OAAUs. To address this problem, DRU 1 (1532) can, for each antenna, separately transmit satellite signals to the antenna. For example, FIG. 15 shows how four satellite signals can be temporally segregated (e.g., in a non-overlapping manner) during a transmission time period. This process can be controlled by a switch (e.g., located at DRU 1 but being specific to one antenna) which indicates which satellite signal is to be transmitted to an antenna at a given time. As described in further detail below, a manipulation in which each of these signals is selectively delayed can allow a collective signal analysis of the satellite signals to identify a true location of a receiving antenna. Each receiving antenna transmits the received signals, and a user's mobile station then collects, from each antenna, a set of temporally segregated and delayed satellite signals.

The GPS signals from each of the antennas surrounding the mobile station (1542) will be delayed by the propagation distances between the antennas and the user. The mobile station can store the GPS signals from each antenna along with the corresponding signal time delay. The mobile station (1542) can utilize this information to accurately estimate the GPS position of the user with a granularity greater than that of antenna spacing.

Figure 16:
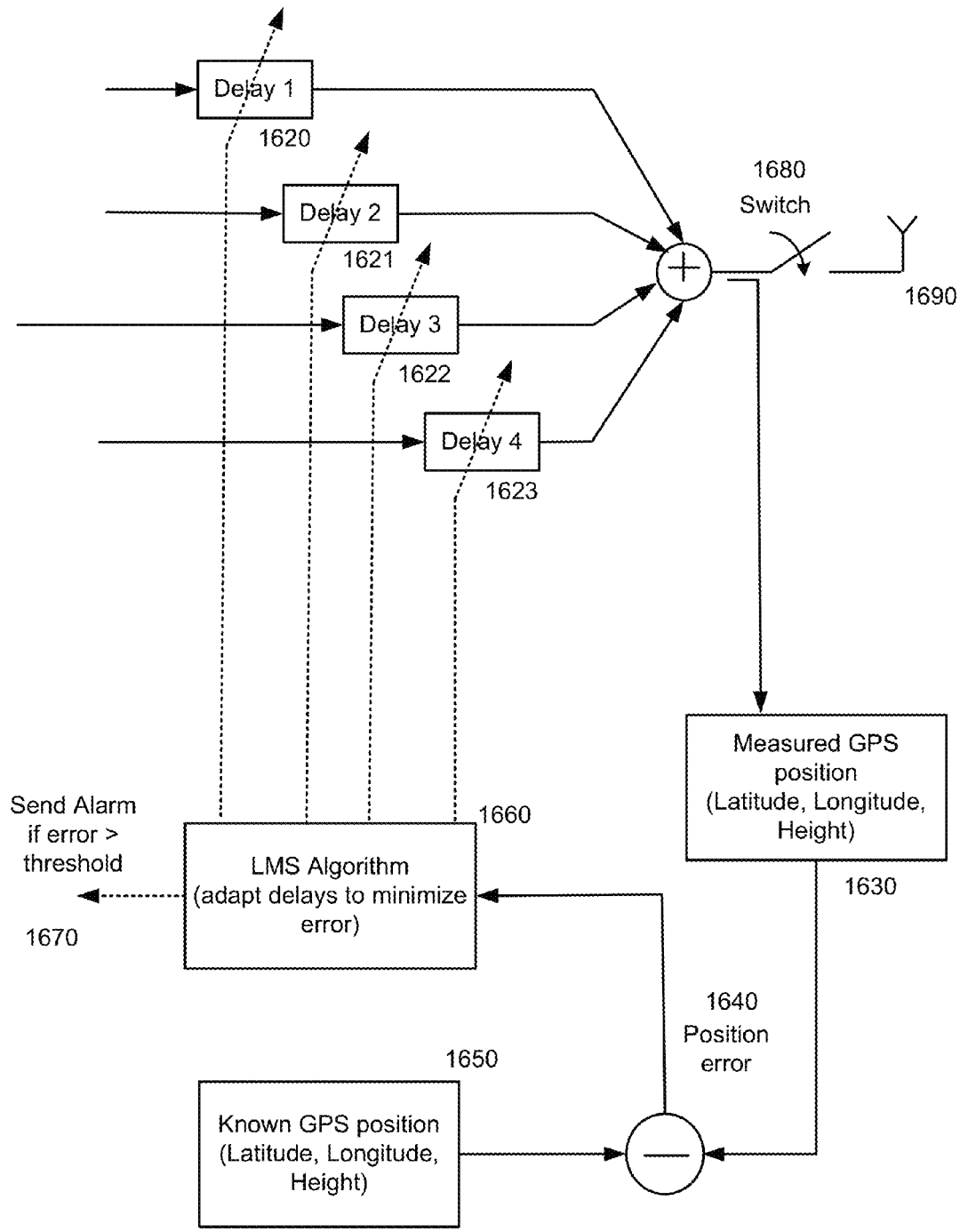
FIG. 16 is a high-level schematic diagram illustrating an adaptive loop according to an embodiment of the invention used to determine delay values for individual Satellite GPS signals at various DRUs. Each antenna can transmit its GPS signal when the switch is closed. The switches are synchronized at each antenna.

FIG. 16 is a high-level representation of a Feedback system according to an embodiment of the invention used to control the Satellite GPS signal Delays (1620,1621,1622, 1623)—each Delay pertaining to a signal from a specific satellite. The Feedback system can be, e.g., within a DRU and can, e.g., feed to an antenna. Thus, in the embodiment depicted in FIG. 15, DRU 1 can include four Feedback systems (one for each antenna), each having four delays. (It will be appreciated that in alternative embodiments, DRU 1 includes multiple LMS algorithms, delay introductions and error determinations, but includes a single switch.) The GPS receiver measures the transmitted GPS signal (which can include a signal with distinct time periods for transmitting signals from distinct satellites) from the DRU and determines the position (Latitude, Longitude, Height) in block (1630). This position can be determined based on advanced triangulation techniques. This position is compared to a known GPS position (1650) of a respective antenna 1680 (receiving the signal) that was established during provisioning. The resultant position error (1640) is used to drive an adaptive algorithm such as the Least Mean Squared (LMS) algorithm. The Delays (1620,1621,1622,1623) are adjusted to reduce (e.g., minimize) the resultant position error (1640). The switch (1680) is time synchronized so that each GPS signal from the respective antennas is transmitted at a unique time.

Figure 17:
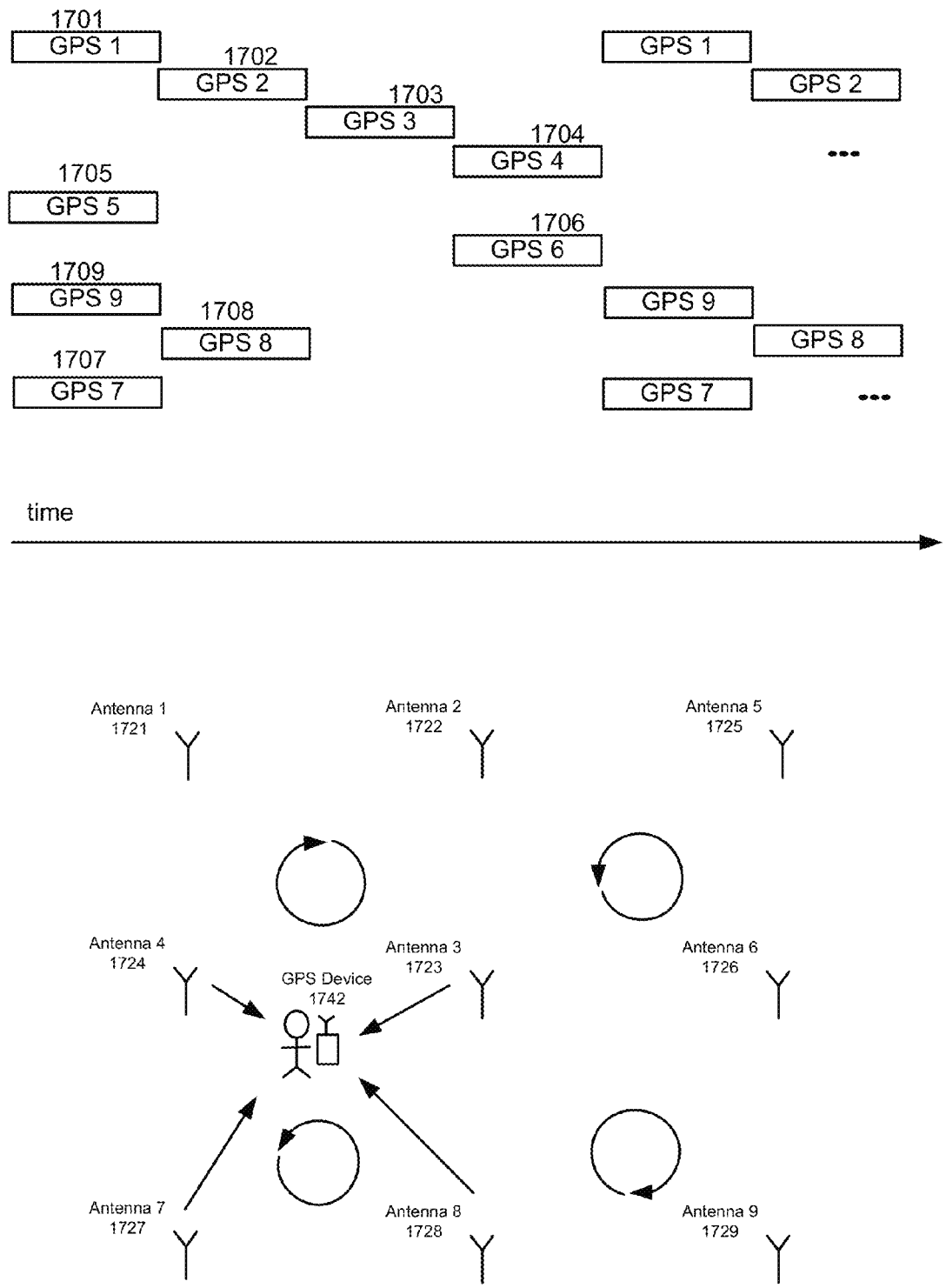
FIG. 17 illustrates synchronized timing of the individual antenna GPS transmissions according to an embodiment of the invention.

FIG. 17 shows a high-level representation of a system that transmits concurrent time-staggered GPS signals. The system parallels that shown in FIG. 15, but it includes more antennas and can correspond to a larger geographical area. In this embodiment, 9 antennas are used to cover the geographical space. Each of the antennas transmits its GPS positional information during a given time frame. Notably, some GPS signals are transmitted at a same (or overlapping) time period. This can nonetheless allow for an estimate of the mobile station to be made, due to the reality that the mobile station will continue to receive signals from different antenna. That is, the mobile station will receive different signals in each of the four depicted time periods regardless of which of the concurrent signals the mobile station locks to. These multiple signals can be used as described herein to estimate the mobile station's location. Further, the geographic disparity in the antennae can promote specific signal receipt. For example, device 1742 will likely receive the signal from Antenna 7 (1727), rather than a signal from any of antenna 1 (1721), antenna 5 (1725) or antenna 9 (1729): the device's proximity to antenna 7 will likely result in the signal from antenna 7 be strong relative to any of the other three signal. In another embodiment, the GPS signals from the respective antennas may be transmitted at unique time intervals for 4 or more antennas that cover a given geographical area. Still further, transmission times and/or signal frequency bands can be adjusted to promote selective receipt of the signals at a mobile station and/or to inhibit any interference.

Figure 18:
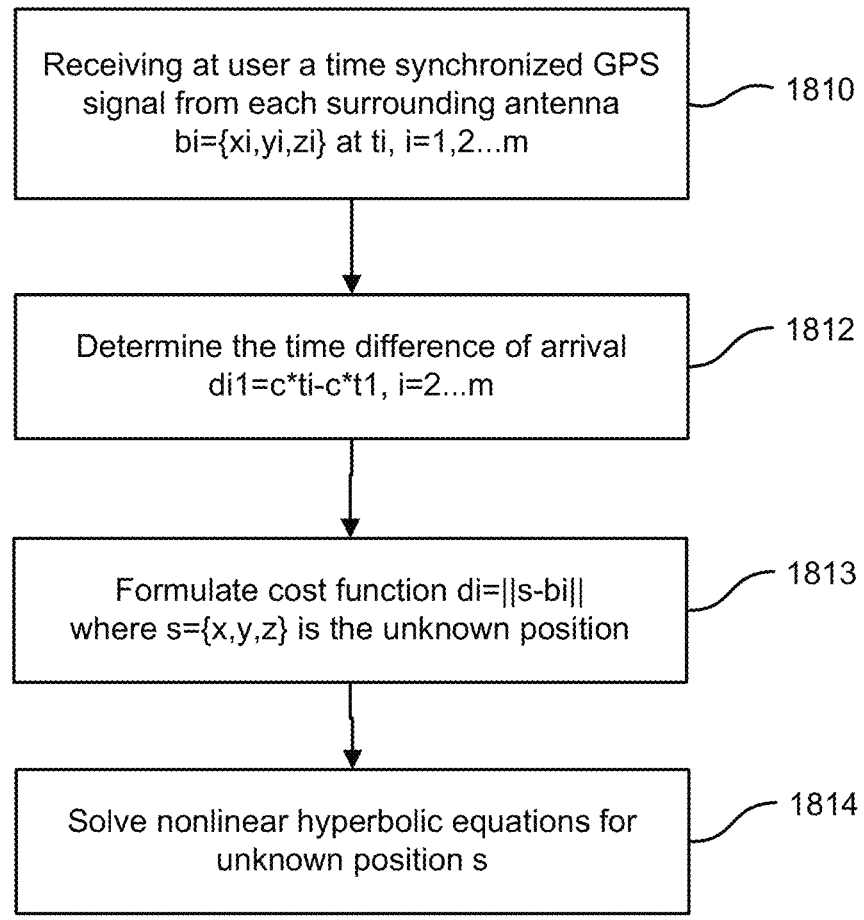
FIG. 18 is a high level flowchart illustrating a method for estimating a user's GPS position based on time-synchronized GPS signals form surrounding antennas and their respective time delays.

FIG. 18 is a high level flowchart illustrating a method for estimating a user's GPS position according to an embodiment of the invention. The depicted method can be performed, e.g., fully or partly at a mobile station (e.g., via automatic hardware detection and/or by executing an app or other software on the mobile station). By analyzing time differences between receipt of delayed satellite signals, an estimated user location can be determined. DRU antennas (hereafter referred to as the Base Stations (BS)) GPS positions are known and are broadcast at time-synchronized intervals. The mobile station/user will be referred to as the mobile station (MS). The MS receives the signals from the time-synchronized BSs. There is a time difference between the when a signal was transmitted from a BS and when it was received by the MS. The signal can identify the former time point, and the MS can detect the latter. A position of the MS can then be estimated by identifying an intersection of hyberbolas according to the definition of Time Difference of Arrival (TDOA). The problem of geolocation can be formulated as:

$$d_i = \|s - b_i\|$$

$$d_{i1} = ct_{i1} = ct_i - ct_1$$

$$b_i = col\{x_i, y_i, z_i\}, i = 1, 2, 3, \ldots, m$$

$$s = col\{x, y, z\}$$

where $b_i$ is the known position of the i-th Base Station (DRU antenna), s is the unknown position of the MS (user), and c is the propagation speed of the signal. In the above equation, $d_i$ represents the distance between the i-th BS and the MS and $t_i$ is the time of signal arrival (TOA) from the i-th BS to the MS. Hence, $t_{i1}$ becomes the TDOA which is the difference of TOA between $t_i$ and $t_1$. The distance difference $d_{i1}$ results from the multiplication of TDOA and c.

The estimation of geolocation position s can be obtained by solving the nonlinear hyperbolic equation from the relation of TDOA. An extended Kalman Filter algorithm and/or a cost-function-minimizing technique can be used to solve intersection of the nonlinear hyperbolic equations.

In some embodiments, software or an app is provided to support position estimations as disclosed herein. For example, an app can perform one or more of blocks 1812-1814 shown in FIG. 18. The app can, e.g., extract location information (e.g., a DRU antenna's location) and time information (e.g., a signal transmission time) from a received signal, access a TOA, determine a TDOA, analyze a set of TDOAs and corresponding signal information, and estimate a mobile-station location (e.g., as a signal-intersection location). Further, a position-estimation technique disclosed herein can be integrated into an app with a primary objective extending beyond a location-based service (e.g., a social-network app, a translator app, a postage-calculator app, etc.).

Embodiments can further be extended to include transmitting an estimated location to another device. The receiving device can then estimate its proximity to the mobile station and evaluate conditional actions. For example, a first mobile station can estimate its location using a process disclosed herein. It can then transmit its location to nearby second devices. A second device can estimate a distance separating it from the first mobile station and can compare the distance to a threshold. If the distance is less than the threshold, the second device can transmit an electronic advertising message to the mobile station. In another example, a mobile station can include an app that uses its location to update a user's current location on a geolocation or social-networking site. In yet another example, a map app can use the current location to provide a default "origin" location such that a user can easily obtain directions to another place.

It will be appreciated that systems and methods disclosed herein can pertain to a variety of mobile devices. In some instances, a mobile station includes a phone, smartphone, tablet, laptop, positioning device or direction-providing device (e.g., operating independently or within a vehicle). In some instances, a mobile station includes an electronic dot or pin that can be positioned on and/or attached to other items. The other items can then be tracked. For example, an electronic dot can be attached to a valuable piece of merchandise. If the dot then moves outside of a specified region or moves by a threshold amount, an alert can be transmitted (e.g., suggesting that shop-lifting may be occurring).

While systems, methods and computer media disclosed herein can be particularly useful for estimating an indoor location, they can also be used to estimate an outdoor location. In some instances, an outdoor location is first estimated (e.g., a location of a DRU is estimated) based on an analysis of signals received from multiple satellites (e.g., using a traditional global-navigation-satellite-system analysis), and either the location is then refined using a technique disclosed herein. For example, a technique disclosed herein can estimate a location relate to a DRU, such that an absolute location can be estimated based on a combination of an estimated location of the DRU and the estimated relative location.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A distributed antenna system for localization using satellite navigation signals, the distributed antenna system comprising:
   an Off-Air Access Unit (OAAU) operable to:
      receive a satellite navigation signal from a satellite, and
      route the satellite navigation signal to a digital remote unit (DRU); and
   the DRU, the DRU being located at a location remote from the OAAU, wherein the DRU is operable to:
      receive the routed signal from the OAAU,
      delay the received signal, and
      transmit the delayed signal to an antenna.

2. The distributed antenna system of claim 1, further comprising a digital access unit (DAU) configured to:
   receive the satellite navigation signal from the OAAU; and
   transmit the satellite navigation signal to the DRU.

3. The distributed antenna system of claim 2, wherein the OAAU is connected to the DAU via an Ethernet cable, Optical Fiber, or Wireless Link.

4. The distributed antenna system of claim 1, further comprising a plurality of local DAUs coupled together via an Ethernet cable, Optical Fiber, or Wireless Link.

5. The distributed antenna system of claim 1, wherein the DRU is further configured to determine a delay amount based on a feedback loop utilizing a known location of the antenna.

6. The distributed antenna system of claim 1, wherein the satellite navigation signal comprises a GPS, GLONASS, Galileo, QZSS, or BeiDou signal.

7. The distributed antenna system of claim 1, wherein the DRU is further configured to estimate the location of the antenna based on the delayed signal.

8. The distributed antenna system of claim 1, wherein the DRU is further operable to:
   receive a second signal from a same or different OAAU,
   delay the second signal, the signal and second signal being delayed by different amounts, and
   transmit the delayed second signal to the antenna.

9. The distributed antenna system of claim 1, wherein delaying the signal comprises delaying the signal by a first amount, and wherein the DRU is further operable to:
   delay the received signal by a second amount,
   transmit the signal delayed by the second amount to a second antenna.

10. The distributed antenna system of claim 1, wherein the DRU comprises a switch, and wherein whether the delayed signal is transmitted to the antenna depends on a position of the switch.

11. The distributed antenna system of claim 1, wherein only a portion of the delayed signal is transmitted to the antenna, the portion having a defined time duration.

12. A system for localization using satellite navigation signals in a Distributed Antenna System (DAS), the system comprising:
   one or more Off-Air Access Units (OAAUs) operable to:
      receive a first satellite navigation signal from a first satellite,
      receive a second satellite navigation signal from a second satellite, and
      route the first satellite navigation signal to a Digital Remote Unit (DRU); and
      route the second satellite navigation signal to the DRU; and
   the DRU, the DRU being located at a location remote from the OAAU and comprising a switch, wherein the DRU is operable to:
      receive the routed first signal from the one or more OAAUs,
      receive the routed second signal from the one or more OAAUs,
      transmit a first portion of the first signal to an antenna while the switch is in a first position, and
      transmit a second portion of the second signal to the antenna while the switch is in a second position.

13. The system of claim 12, further comprising one or more DAUs configured to:
   receive the first satellite navigation signal from the one or more OAAUs; and
   receive the second satellite navigation signal from the one or more OAAUs; and
   transmit the satellite navigation signal to the DRU.

14. The system of claim 13, wherein the one or more DAUs include a plurality of DAUs, and wherein the plurality of DAUs are coupled together via an Ethernet cable, Optical Fiber, or Wireless Link.

15. The system of claim 12, wherein the DRU is further configured to delay the first signal.

16. The system of claim 15, wherein the DRU is further configured to determine a delay amount based on a feedback loop utilizing a known location of the antenna.

17. The system of claim 15, wherein the DRU is further configured to estimate a location of the antenna based on the delayed signal.

18. The system of claim 12, wherein each of the first satellite navigation signal and the second satellite navigation signal comprises a GPS, GLONASS, Galileo, QZSS, or BeiDou signal.

19. The system of claim 12, wherein the first portion has a defined time duration.

\* \* \* \* \*